US010698599B2

(12) United States Patent
D'angelo et al.

(10) Patent No.: US 10,698,599 B2
(45) Date of Patent: Jun. 30, 2020

(54) CONNECTING GRAPHICAL SHAPES USING GESTURES

(71) Applicant: Pegasystems Inc., Cambridge, MA (US)

(72) Inventors: Massimiliano D'angelo, Amsterdam (NL); Bettina Kast, Amsterdam (NL); Guangxue Cao, Amsterdam (NL); Piotr Kala, Grybow (PL); Mihai-Robert Nae, Amsterdam (NL)

(73) Assignee: Pegasystems, Inc., Cambridge, MA (US)

( * ) Notice: Subject to any disclaimer, the term of this patent is extended or adjusted under 35 U.S.C. 154(b) by 0 days.

(21) Appl. No.: 15/613,439

(22) Filed: Jun. 5, 2017

(65) Prior Publication Data

US 2017/0351425 A1    Dec. 7, 2017

Related U.S. Application Data

(60) Provisional application No. 62/345,367, filed on Jun. 3, 2016.

(51) Int. Cl.
*G09G 5/00* (2006.01)
*G06F 3/0488* (2013.01)
*G06F 3/0484* (2013.01)

(52) U.S. Cl.
CPC ...... *G06F 3/04883* (2013.01); *G06F 3/04845* (2013.01); *G06F 2203/04808* (2013.01)

(58) Field of Classification Search
None
See application file for complete search history.

(56) References Cited

U.S. PATENT DOCUMENTS

| 4,047,059 A | 9/1977 | Rosenthal |
| 4,344,142 A | 8/1982 | Diehr, II et al. |

(Continued)

FOREIGN PATENT DOCUMENTS

| DE | 19911098 A1 | 12/1999 |
| EP | 0 549 208 A2 | 6/1993 |

(Continued)

OTHER PUBLICATIONS

Summons to Attend Oral Proceedings pursuant to rule 115(1) EPC, issued May 2, 2018 for Application No. 08731127.0 (8 pages).

(Continued)

*Primary Examiner* — Anh-Tuan V Nguyen
(74) *Attorney, Agent, or Firm* — Davis Malm & D'Agostine, P.C.; David J. Powsner

(57) ABSTRACT

The present disclosure describes systems and apparatuses for connecting graphical shapes. A client digital data processor receives selection events. Each selection event tracks one or more input locations. The client digital data processor identifies a source and target graphical shape based at least on the received selection events. The client digital data processor determines a source and target connection point for a connector based at least on the source and target graphical shapes. The client digital data processor determines a length for the connector based at least on the source and target connection points. The client digital data processor generates and displays the connector based at least on the source and target connection points and the length. The present disclosure also describes methods for operating a client digital data processor as described above, and a computer-readable medium storing a program having instructions for so operating a client digital data processor.

14 Claims, 6 Drawing Sheets

(56) References Cited

U.S. PATENT DOCUMENTS

| | | |
|---|---|---|
| 4,602,168 A | 7/1986 | Single |
| 4,607,232 A | 8/1986 | Gill, Jr. |
| 4,659,944 A | 4/1987 | Miller, Sr. et al. |
| 4,701,130 A | 10/1987 | Whitney et al. |
| 4,866,634 A | 9/1989 | Reboh et al. |
| 4,884,217 A | 11/1989 | Skeirik et al. |
| 4,895,518 A | 1/1990 | Arnold et al. |
| 4,930,071 A | 5/1990 | Tou et al. |
| 4,953,106 A | 8/1990 | Gansner et al. |
| 5,062,060 A | 10/1991 | Kolnick |
| 5,077,491 A | 12/1991 | Heck et al. |
| 5,093,794 A | 3/1992 | Howie et al. |
| 5,119,465 A | 6/1992 | Jack et al. |
| 5,129,043 A | 7/1992 | Yue |
| 5,136,184 A | 8/1992 | Deevy |
| 5,136,523 A | 8/1992 | Landers |
| 5,140,671 A | 8/1992 | Hayes et al. |
| 5,193,056 A | 3/1993 | Boes |
| 5,199,068 A | 3/1993 | Cox |
| 5,204,939 A | 4/1993 | Yamazaki et al. |
| 5,228,116 A | 7/1993 | Harris et al. |
| 5,259,766 A | 11/1993 | Sack et al. |
| 5,262,941 A | 11/1993 | Saladin et al. |
| 5,267,175 A | 11/1993 | Hooper |
| 5,267,865 A | 12/1993 | Lee et al. |
| 5,270,920 A | 12/1993 | Pearse et al. |
| 5,276,359 A | 1/1994 | Chiang |
| 5,276,885 A | 1/1994 | Milnes et al. |
| 5,291,394 A | 3/1994 | Chapman |
| 5,291,583 A | 3/1994 | Bapat |
| 5,295,256 A | 3/1994 | Bapat |
| 5,297,279 A | 3/1994 | Bannon et al. |
| 5,301,270 A | 4/1994 | Steinberg et al. |
| 5,310,349 A | 5/1994 | Daniels et al. |
| 5,311,422 A | 5/1994 | Loftin et al. |
| 5,326,270 A | 7/1994 | Ostby et al. |
| 5,333,254 A | 7/1994 | Robertson |
| 5,339,390 A | 8/1994 | Robertson et al. |
| 5,374,932 A | 12/1994 | Wyschogrod et al. |
| 5,379,366 A | 1/1995 | Noyes |
| 5,379,387 A | 1/1995 | Carlstedt et al. |
| 5,381,332 A | 1/1995 | Wood |
| 5,386,559 A | 1/1995 | Eisenberg et al. |
| 5,395,243 A | 3/1995 | Lubin et al. |
| 5,412,756 A | 5/1995 | Bauman et al. |
| 5,421,011 A | 5/1995 | Camillone et al. |
| 5,421,730 A | 6/1995 | Lasker, III et al. |
| 5,446,397 A | 8/1995 | Yotsuyanagi |
| 5,446,885 A | 8/1995 | Moore et al. |
| 5,450,480 A | 9/1995 | Man et al. |
| 5,463,682 A | 10/1995 | Fisher et al. |
| 5,473,732 A | 12/1995 | Chang |
| 5,477,170 A | 12/1995 | Yotsuyanagi |
| 5,481,647 A | 1/1996 | Brody et al. |
| 5,499,293 A | 3/1996 | Behram et al. |
| 5,504,879 A | 4/1996 | Eisenberg et al. |
| 5,512,849 A | 4/1996 | Wong |
| 5,519,618 A | 5/1996 | Kastner et al. |
| 5,537,590 A | 7/1996 | Amado |
| 5,542,024 A | 7/1996 | Balint et al. |
| 5,542,078 A | 7/1996 | Martel et al. |
| 5,548,506 A | 8/1996 | Srinivasan |
| 5,561,740 A | 10/1996 | Barrett et al. |
| 5,579,223 A | 11/1996 | Raman |
| 5,579,486 A | 11/1996 | Oprescu et al. |
| 5,586,311 A | 12/1996 | Davies et al. |
| 5,596,752 A | 1/1997 | Knudsen et al. |
| 5,597,312 A | 1/1997 | Bloom et al. |
| 5,608,789 A | 3/1997 | Fisher et al. |
| 5,611,076 A | 3/1997 | Durflinger et al. |
| 5,627,979 A | 5/1997 | Chang et al. |
| 5,630,127 A | 5/1997 | Moore et al. |
| 5,649,192 A | 7/1997 | Stucky |
| 5,655,118 A | 8/1997 | Heindel et al. |
| 5,664,206 A | 9/1997 | Murow et al. |
| 5,675,753 A | 10/1997 | Hansen et al. |
| 5,678,039 A | 10/1997 | Hinks et al. |
| 5,689,663 A | 11/1997 | Williams |
| 5,715,450 A | 2/1998 | Ambrose et al. |
| 5,732,192 A | 3/1998 | Malin et al. |
| 5,754,740 A | 5/1998 | Fukuoka et al. |
| 5,761,063 A | 6/1998 | Jannette et al. |
| 5,761,673 A | 6/1998 | Bookman et al. |
| 5,765,140 A | 6/1998 | Knudson et al. |
| 5,768,480 A | 6/1998 | Crawford, Jr. et al. |
| 5,788,504 A | 8/1998 | Rice et al. |
| 5,795,155 A | 8/1998 | Morrel-Samuels |
| 5,809,212 A | 9/1998 | Shasha |
| 5,815,415 A | 9/1998 | Bentley et al. |
| 5,819,243 A | 10/1998 | Rich et al. |
| 5,819,257 A | 10/1998 | Monge et al. |
| 5,822,780 A | 10/1998 | Schutzman |
| 5,825,260 A | 10/1998 | Ludwig et al. |
| 5,826,077 A | 10/1998 | Blakeley et al. |
| 5,826,239 A | 10/1998 | Du et al. |
| 5,826,250 A | 10/1998 | Trefler |
| 5,826,252 A | 10/1998 | Wolters, Jr. et al. |
| 5,829,983 A | 11/1998 | Koyama et al. |
| 5,831,607 A | 11/1998 | Brooks |
| 5,832,483 A | 11/1998 | Barker |
| 5,841,435 A | 11/1998 | Dauerer et al. |
| 5,841,673 A | 11/1998 | Kobayashi et al. |
| 5,864,865 A | 1/1999 | Lakis |
| 5,873,096 A | 2/1999 | Lim et al. |
| 5,875,334 A | 2/1999 | Chow et al. |
| 5,875,441 A | 2/1999 | Nakatsuyama et al. |
| 5,880,614 A | 3/1999 | Zinke et al. |
| 5,880,742 A | 3/1999 | Rao et al. |
| 5,886,546 A | 3/1999 | Hwang |
| 5,890,146 A | 3/1999 | Wavish et al. |
| 5,890,166 A | 3/1999 | Eisenberg et al. |
| 5,892,512 A | 4/1999 | Donnelly et al. |
| 5,907,490 A | 5/1999 | Oliver |
| 5,907,837 A | 5/1999 | Ferrel et al. |
| 5,909,213 A | 6/1999 | Martin |
| 5,910,748 A | 6/1999 | Reffay et al. |
| 5,911,138 A | 6/1999 | Li et al. |
| 5,918,222 A | 6/1999 | Fukui et al. |
| 5,920,717 A | 7/1999 | Noda |
| 5,930,795 A | 7/1999 | Chen et al. |
| 5,945,852 A | 8/1999 | Kosiec |
| 5,974,441 A | 10/1999 | Rogers et al. |
| 5,974,443 A | 10/1999 | Jeske |
| 5,978,566 A | 11/1999 | Plank et al. |
| 5,983,267 A | 11/1999 | Shklar et al. |
| 5,983,369 A | 11/1999 | Bakoglu et al. |
| 5,987,415 A | 11/1999 | Breese et al. |
| 5,990,742 A | 11/1999 | Suzuki |
| 5,995,948 A | 11/1999 | Whitford et al. |
| 5,995,958 A | 11/1999 | Xu |
| 6,008,673 A | 12/1999 | Glass et al. |
| 6,008,808 A | 12/1999 | Almeida et al. |
| 6,012,098 A | 1/2000 | Bayeh et al. |
| 6,020,768 A | 2/2000 | Lim |
| 6,023,704 A | 2/2000 | Gerard et al. |
| 6,023,714 A | 2/2000 | Hill et al. |
| 6,023,717 A | 2/2000 | Argyroudis |
| 6,028,457 A | 2/2000 | Tihanyi |
| 6,037,890 A | 3/2000 | Glass et al. |
| 6,044,373 A | 3/2000 | Gladney et al. |
| 6,044,466 A | 3/2000 | Anand et al. |
| 6,078,982 A | 6/2000 | Du et al. |
| 6,085,188 A | 7/2000 | Bachmann et al. |
| 6,085,198 A | 7/2000 | Skinner et al. |
| 6,091,226 A | 7/2000 | Amano |
| 6,092,036 A | 7/2000 | Hamann |
| 6,092,083 A | 7/2000 | Brodersen et al. |
| 6,094,652 A | 7/2000 | Faisal |
| 6,098,172 A | 8/2000 | Coss |
| 6,105,035 A | 8/2000 | Monge et al. |
| 6,108,004 A | 8/2000 | Medl |
| 6,122,632 A | 9/2000 | Botts et al. |
| 6,125,363 A | 9/2000 | Buzzeo et al. |
| 6,130,679 A | 10/2000 | Chen et al. |

(56) References Cited

U.S. PATENT DOCUMENTS

| | | |
|---|---|---|
| 6,137,797 A | 10/2000 | Bass et al. |
| 6,144,997 A | 11/2000 | Lamming et al. |
| 6,151,595 A | 11/2000 | Pirolli et al. |
| 6,151,624 A | 11/2000 | Teare et al. |
| 6,154,738 A | 11/2000 | Call |
| 6,167,441 A | 12/2000 | Himmel |
| 6,177,932 B1 | 1/2001 | Galdes et al. |
| 6,185,516 B1 | 2/2001 | Hardin et al. |
| 6,185,534 B1 | 2/2001 | Breese et al. |
| 6,192,371 B1 | 2/2001 | Schultz |
| 6,194,919 B1 | 2/2001 | Park |
| 6,212,502 B1 | 4/2001 | Ball et al. |
| 6,216,135 B1 | 4/2001 | Brodersen et al. |
| 6,233,332 B1 | 5/2001 | Anderson et al. |
| 6,233,617 B1 | 5/2001 | Rothwein et al. |
| 6,240,417 B1 | 5/2001 | Eastwick et al. |
| 6,243,713 B1 | 6/2001 | Nelson et al. |
| 6,246,320 B1 | 6/2001 | Monroe |
| 6,275,073 B1 | 8/2001 | Tokuhiro |
| 6,275,790 B1 | 8/2001 | Yamamoto et al. |
| 6,281,896 B1 | 8/2001 | Alimpich et al. |
| 6,282,547 B1 | 8/2001 | Hirsch |
| 6,300,947 B1 | 10/2001 | Kanevsky |
| 6,304,259 B1 | 10/2001 | DeStefano |
| 6,308,163 B1 | 10/2001 | Du et al. |
| 6,310,951 B1 | 10/2001 | Wineberg et al. |
| 6,311,324 B1 | 10/2001 | Smith et al. |
| 6,313,834 B1 | 11/2001 | Lau et al. |
| 6,314,415 B1 | 11/2001 | Mukherjee |
| 6,324,693 B1 | 11/2001 | Brodersen et al. |
| 6,330,554 B1 | 12/2001 | Altschuler et al. |
| 6,338,074 B1 | 1/2002 | Poindexter et al. |
| 6,341,277 B1 | 1/2002 | Coden et al. |
| 6,341,293 B1 | 1/2002 | Hennessey |
| 6,344,862 B1 | 2/2002 | Williams et al. |
| 6,349,238 B1 | 2/2002 | Gabbita et al. |
| 6,351,734 B1 | 2/2002 | Lautzenheiser et al. |
| 6,356,286 B1 | 3/2002 | Lawrence |
| 6,356,897 B1 | 3/2002 | Gusack |
| 6,359,633 B1 | 3/2002 | Balasubramaniam et al. |
| 6,366,299 B1 | 4/2002 | Lanning et al. |
| 6,369,819 B1 | 4/2002 | Pitkow et al. |
| 6,370,537 B1 | 4/2002 | Gilbert et al. |
| 6,380,910 B1 | 4/2002 | Moustakas et al. |
| 6,380,947 B1 | 4/2002 | Stead |
| 6,381,738 B1 | 4/2002 | Choi et al. |
| 6,389,460 B1 | 5/2002 | Stewart et al. |
| 6,389,510 B1 | 5/2002 | Chen et al. |
| 6,393,605 B1 | 5/2002 | Loomans |
| 6,396,885 B1 | 5/2002 | Ding et al. |
| 6,405,211 B1 | 6/2002 | Sokol et al. |
| 6,405,251 B1 | 6/2002 | Bullard et al. |
| 6,415,259 B1 | 7/2002 | Wolfinger et al. |
| 6,415,283 B1 | 7/2002 | Conklin |
| 6,418,448 B1 | 7/2002 | Sarkar |
| 6,421,571 B1 | 7/2002 | Spriggs et al. |
| 6,426,723 B1 | 7/2002 | Smith et al. |
| 6,429,870 B1 | 8/2002 | Chen et al. |
| 6,430,571 B1 | 8/2002 | Doan et al. |
| 6,430,574 B1 | 8/2002 | Stead |
| 6,437,799 B1 | 8/2002 | Shinomi et al. |
| 6,446,065 B1 | 9/2002 | Nishioka et al. |
| 6,446,089 B1 | 9/2002 | Brodersen et al. |
| 6,446,200 B1 | 9/2002 | Ball et al. |
| 6,446,256 B1 | 9/2002 | Hyman et al. |
| 6,448,964 B1 | 9/2002 | Isaacs et al. |
| 6,453,038 B1 | 9/2002 | McFarlane et al. |
| 6,463,346 B1 | 10/2002 | Flockhart et al. |
| 6,463,440 B1 | 10/2002 | Hind et al. |
| 6,469,715 B1 | 10/2002 | Carter et al. |
| 6,469,716 B1 | 10/2002 | Carter et al. |
| 6,473,467 B1 | 10/2002 | Wallace et al. |
| 6,473,748 B1 | 10/2002 | Archer |
| 6,493,331 B1 | 12/2002 | Walton et al. |
| 6,493,399 B1 | 12/2002 | Xia et al. |
| 6,493,731 B1 | 12/2002 | Jones et al. |
| 6,493,754 B1 | 12/2002 | Rosborough et al. |
| 6,496,812 B1 | 12/2002 | Campaigne et al. |
| 6,496,833 B1 | 12/2002 | Goldberg et al. |
| 6,502,239 B2 | 12/2002 | Zgarba et al. |
| 6,509,898 B2 | 1/2003 | Chi et al. |
| 6,513,018 B1 | 1/2003 | Culhane |
| 6,526,440 B1 | 2/2003 | Bharat |
| 6,526,457 B1 | 2/2003 | Birze |
| 6,529,217 B1 | 3/2003 | Maguire, III et al. |
| 6,529,899 B1 | 3/2003 | Kraft et al. |
| 6,529,900 B1 | 3/2003 | Patterson et al. |
| 6,530,079 B1 | 3/2003 | Choi et al. |
| 6,532,474 B2 | 3/2003 | Iwamoto et al. |
| 6,539,374 B2 | 3/2003 | Jung |
| 6,542,912 B2 | 4/2003 | Meltzer et al. |
| 6,546,381 B1 | 4/2003 | Subramanian et al. |
| 6,546,406 B1 | 4/2003 | DeRose et al. |
| 6,549,904 B1 | 4/2003 | Ortega et al. |
| 6,556,226 B2 | 4/2003 | Gould et al. |
| 6,556,983 B1 | 4/2003 | Altschuler et al. |
| 6,556,985 B1 | 4/2003 | Karch |
| 6,559,864 B1 | 5/2003 | Olin |
| 6,560,592 B1 | 5/2003 | Reid et al. |
| 6,560,649 B1 | 5/2003 | Mullen et al. |
| 6,567,419 B1 | 5/2003 | Yarlagadda |
| 6,571,222 B1 | 5/2003 | Matsumoto et al. |
| 6,577,769 B1 | 6/2003 | Kenyon et al. |
| 6,583,800 B1 | 6/2003 | Ridgley et al. |
| 6,584,464 B1 | 6/2003 | Warthen |
| 6,584,569 B2 | 6/2003 | Reshef et al. |
| 6,594,662 B1 | 7/2003 | Sieffert et al. |
| 6,597,381 B1 | 7/2003 | Eskridge et al. |
| 6,597,775 B2 | 7/2003 | Lawyer et al. |
| 6,598,043 B1 | 7/2003 | Baclawski |
| 6,606,613 B1 | 8/2003 | Altschuler et al. |
| 6,625,657 B1 | 9/2003 | Bullard |
| 6,629,138 B1 | 9/2003 | Lambert et al. |
| 6,636,850 B2 | 10/2003 | Lepien |
| 6,636,901 B2 | 10/2003 | Sudhakaran et al. |
| 6,643,638 B1 | 11/2003 | Xu |
| 6,643,652 B2 | 11/2003 | Helgeson et al. |
| 6,661,889 B1 | 12/2003 | Flockhart et al. |
| 6,661,908 B1 | 12/2003 | Suchard et al. |
| 6,678,679 B1 | 1/2004 | Bradford |
| 6,678,773 B2 | 1/2004 | Marietta et al. |
| 6,678,882 B1 | 1/2004 | Hurley et al. |
| 6,684,261 B1 | 1/2004 | Orton et al. |
| 6,690,788 B1 | 2/2004 | Bauer et al. |
| 6,691,067 B1 | 2/2004 | Ding et al. |
| 6,691,230 B1 | 2/2004 | Bardon |
| 6,701,314 B1 | 3/2004 | Conover et al. |
| 6,711,565 B1 | 3/2004 | Subramaniam et al. |
| 6,721,747 B2 | 4/2004 | Lipkin |
| 6,728,702 B1 | 4/2004 | Subramaniam et al. |
| 6,728,852 B1 | 4/2004 | Stoutamire |
| 6,732,095 B1 | 5/2004 | Warshaysky et al. |
| 6,732,111 B2 | 5/2004 | Brodersen et al. |
| 6,748,422 B2 | 6/2004 | Morin et al. |
| 6,750,858 B1 | 6/2004 | Rosenstein |
| 6,751,663 B1 | 6/2004 | Farrell et al. |
| 6,754,475 B1 | 6/2004 | Harrison et al. |
| 6,756,994 B1 | 6/2004 | Tlaskal |
| 6,763,351 B1 | 7/2004 | Subramaniam et al. |
| 6,771,706 B2 | 8/2004 | Ling et al. |
| 6,772,148 B2 | 8/2004 | Baclawski |
| 6,772,350 B1 | 8/2004 | Belani et al. |
| 6,778,971 B1 | 8/2004 | Altschuler et al. |
| 6,782,091 B1 | 8/2004 | Dunning, III |
| 6,785,341 B2 | 8/2004 | Walton et al. |
| 6,788,114 B1 | 9/2004 | Krenzke et al. |
| 6,792,420 B2 | 9/2004 | Stephen Chen et al. |
| RE38,633 E | 10/2004 | Srinivasan |
| 6,804,330 B1 | 10/2004 | Jones et al. |
| 6,807,632 B1 | 10/2004 | Carpentier et al. |
| 6,810,429 B1 | 10/2004 | Walsh et al. |
| 6,820,082 B1 | 11/2004 | Cook et al. |
| 6,829,655 B1 | 12/2004 | Huang et al. |
| 6,831,668 B2 | 12/2004 | Cras et al. |

(56) References Cited

U.S. PATENT DOCUMENTS

| | | |
|---|---|---|
| 6,836,275 B1 * | 12/2004 | Arquie .................. H04L 41/12 709/223 |
| 6,839,682 B1 | 1/2005 | Blume et al. |
| 6,847,982 B2 | 1/2005 | Parker et al. |
| 6,851,089 B1 | 2/2005 | Erickson et al. |
| 6,856,575 B2 | 2/2005 | Jones |
| 6,856,992 B2 | 2/2005 | Britton et al. |
| 6,859,787 B2 | 2/2005 | Fisher et al. |
| 6,865,546 B1 | 3/2005 | Song |
| 6,865,566 B2 | 3/2005 | Serrano-Morales et al. |
| 6,865,575 B1 | 3/2005 | Smith et al. |
| 6,867,789 B1 | 3/2005 | Allen et al. |
| 6,918,222 B2 | 7/2005 | Lat et al. |
| 6,920,615 B1 | 7/2005 | Campbell et al. |
| 6,925,457 B2 | 8/2005 | Britton et al. |
| 6,925,609 B1 | 8/2005 | Lucke |
| 6,927,728 B2 | 8/2005 | Vook et al. |
| 6,934,702 B2 | 8/2005 | Faybishenko et al. |
| 6,940,917 B2 | 9/2005 | Menon et al. |
| 6,944,644 B2 | 9/2005 | Gideon |
| 6,954,737 B2 | 10/2005 | Kalantar et al. |
| 6,956,845 B2 | 10/2005 | Baker et al. |
| 6,959,432 B2 | 10/2005 | Crocker |
| 6,961,725 B2 | 11/2005 | Yuan et al. |
| 6,965,889 B2 | 11/2005 | Serrano-Morales et al. |
| 6,966,033 B1 | 11/2005 | Gasser et al. |
| 6,976,144 B1 | 12/2005 | Trefler et al. |
| 6,978,719 B2 | 12/2005 | Sebata et al. |
| 6,985,912 B2 | 1/2006 | Mullins et al. |
| 6,991,153 B2 | 1/2006 | Silverbrook et al. |
| 7,020,869 B2 | 3/2006 | Abrari et al. |
| 7,020,882 B1 | 3/2006 | Lewallen |
| 7,028,225 B2 | 4/2006 | Maso et al. |
| 7,031,901 B2 | 4/2006 | Abu El Ata |
| 7,035,808 B1 | 4/2006 | Ford |
| 7,058,367 B1 | 6/2006 | Luo et al. |
| 7,058,637 B2 | 6/2006 | Britton et al. |
| 7,064,766 B2 | 6/2006 | Beda et al. |
| 7,073,177 B2 | 7/2006 | Foote et al. |
| 7,076,558 B1 | 7/2006 | Dunn |
| 7,089,193 B2 | 8/2006 | Newbold |
| 7,103,173 B2 | 9/2006 | Rodenbusch et al. |
| 7,124,145 B2 | 10/2006 | Surasinghe |
| 7,139,999 B2 | 11/2006 | Bowman-Amuah |
| 7,143,116 B2 | 11/2006 | Okitsu et al. |
| 7,171,145 B2 | 1/2007 | Takeuchi et al. |
| 7,171,415 B2 | 1/2007 | Kan et al. |
| 7,174,514 B2 | 2/2007 | Subramaniam et al. |
| 7,178,109 B2 | 2/2007 | Hewson et al. |
| 7,194,380 B2 | 3/2007 | Barrow et al. |
| 7,194,690 B2 | 3/2007 | Guillermo et al. |
| 7,289,793 B2 | 10/2007 | Norwood et al. |
| RE39,918 E | 11/2007 | Slemmer |
| 7,302,417 B2 | 11/2007 | Iyer |
| 7,318,020 B1 | 1/2008 | Kim |
| 7,318,066 B2 | 1/2008 | Kaufman et al. |
| 7,334,039 B1 | 2/2008 | Majkut et al. |
| 7,343,295 B2 | 3/2008 | Pomerance |
| 7,353,229 B2 | 4/2008 | Vilcauskas, Jr. et al. |
| 7,398,391 B2 | 7/2008 | Carpentier et al. |
| 7,406,475 B2 | 7/2008 | Dome et al. |
| 7,412,388 B2 | 8/2008 | Dalal et al. |
| 7,415,731 B2 | 8/2008 | Carpentier et al. |
| 7,505,827 B1 | 3/2009 | Boddy et al. |
| 7,526,481 B1 | 4/2009 | Cusson et al. |
| 7,536,294 B1 | 5/2009 | Stanz et al. |
| 7,555,645 B2 | 6/2009 | Vissapragada |
| 7,574,494 B1 | 8/2009 | Mayernick et al. |
| 7,596,504 B2 | 9/2009 | Hughes et al. |
| 7,640,222 B2 | 12/2009 | Trefler |
| 7,647,417 B1 | 1/2010 | Taneja |
| 7,665,063 B1 | 2/2010 | Hofmann et al. |
| 7,685,013 B2 | 3/2010 | Gendler |
| 7,689,447 B1 | 3/2010 | Aboujaoude et al. |
| 7,711,919 B2 | 5/2010 | Trefler et al. |
| 7,779,395 B1 | 8/2010 | Chotin et al. |
| 7,783,596 B2 | 8/2010 | Smolen et al. |
| 7,787,609 B1 | 8/2010 | Flockhart et al. |
| 7,791,559 B2 | 9/2010 | Piasecki |
| 7,818,506 B1 | 10/2010 | Shepstone et al. |
| 7,844,594 B1 | 11/2010 | Holt et al. |
| 7,870,244 B2 | 1/2011 | Chong et al. |
| 7,889,896 B2 | 2/2011 | Roehrig et al. |
| 7,937,690 B2 | 5/2011 | Casey |
| 7,971,180 B2 | 6/2011 | Kreamer et al. |
| 7,974,714 B2 | 7/2011 | Hoffberg |
| 7,983,895 B2 | 7/2011 | McEntee et al. |
| 8,001,519 B2 | 8/2011 | Conallen et al. |
| 8,037,329 B2 | 10/2011 | Leech et al. |
| 8,073,802 B2 | 12/2011 | Trefler |
| 8,250,525 B2 | 8/2012 | Khatutsky |
| 8,335,704 B2 | 12/2012 | Trefler et al. |
| 8,386,960 B1 | 2/2013 | Eismann et al. |
| 8,468,492 B1 | 6/2013 | Frenkel |
| 8,479,157 B2 | 7/2013 | Trefler et al. |
| 8,516,193 B1 | 8/2013 | Clinton et al. |
| 8,739,044 B1 | 5/2014 | Varadarajan |
| 8,843,435 B1 | 9/2014 | Trefler et al. |
| 8,880,487 B1 | 11/2014 | Clinton et al. |
| 8,924,335 B1 | 12/2014 | Trefler et al. |
| 8,959,480 B2 | 2/2015 | Trefler et al. |
| 9,026,733 B1 | 5/2015 | Clinton et al. |
| 9,189,361 B2 | 11/2015 | Khatutsky |
| 9,195,936 B1 | 11/2015 | Chase |
| 9,270,743 B2 | 2/2016 | Frenkel |
| 9,658,735 B2 | 5/2017 | Trefler et al. |
| 9,678,719 B1 | 6/2017 | Frenkel |
| 2001/0013799 A1 | 8/2001 | Wang |
| 2001/0035777 A1 | 11/2001 | Wang et al. |
| 2001/0047355 A1 | 11/2001 | Anwar |
| 2001/0049682 A1 | 12/2001 | Vincent et al. |
| 2001/0052108 A1 | 12/2001 | Bowman-Amuah |
| 2001/0054064 A1 | 12/2001 | Kannan |
| 2002/0010855 A1 | 1/2002 | Reshef et al. |
| 2002/0013804 A1 | 1/2002 | Gideon |
| 2002/0029161 A1 | 3/2002 | Brodersen et al. |
| 2002/0042831 A1 | 4/2002 | Capone et al. |
| 2002/0049603 A1 | 4/2002 | Mehra et al. |
| 2002/0049715 A1 | 4/2002 | Serrano-Morales et al. |
| 2002/0049788 A1 | 4/2002 | Lipkin et al. |
| 2002/0054152 A1 | 5/2002 | Palaniappan et al. |
| 2002/0059566 A1 | 5/2002 | Delcambre et al. |
| 2002/0070972 A1 | 6/2002 | Windl et al. |
| 2002/0073337 A1 | 6/2002 | Ioele et al. |
| 2002/0083063 A1 | 6/2002 | Egolf |
| 2002/0091677 A1 | 7/2002 | Sridhar |
| 2002/0091678 A1 | 7/2002 | Miller et al. |
| 2002/0091710 A1 | 7/2002 | Dunham et al. |
| 2002/0091835 A1 | 7/2002 | Lentini et al. |
| 2002/0093537 A1 | 7/2002 | Bocioned et al. |
| 2002/0107684 A1 | 8/2002 | Gao |
| 2002/0118688 A1 | 8/2002 | Jagannathan |
| 2002/0120598 A1 | 8/2002 | Shadmon et al. |
| 2002/0120627 A1 | 8/2002 | Mankoff |
| 2002/0120762 A1 | 8/2002 | Cheng et al. |
| 2002/0133502 A1 | 9/2002 | Rosenthal et al. |
| 2002/0177232 A1 | 11/2002 | Melker et al. |
| 2002/0178232 A1 | 11/2002 | Ferguson |
| 2002/0181692 A1 | 12/2002 | Flockhart et al. |
| 2002/0184610 A1 | 12/2002 | Chong et al. |
| 2002/0186826 A1 | 12/2002 | Hsu et al. |
| 2002/0198935 A1 | 12/2002 | Crandall et al. |
| 2003/0001894 A1 | 1/2003 | Boykin et al. |
| 2003/0004934 A1 | 1/2003 | Qian |
| 2003/0004951 A1 | 1/2003 | Chokshi |
| 2003/0009239 A1 | 1/2003 | Lombardo et al. |
| 2003/0014399 A1 | 1/2003 | Hansen et al. |
| 2003/0037145 A1 | 2/2003 | Fagan |
| 2003/0050834 A1 | 3/2003 | Caplan |
| 2003/0050927 A1 | 3/2003 | Hussam |
| 2003/0050929 A1 | 3/2003 | Bookman et al. |
| 2003/0061209 A1 | 3/2003 | Raboczi et al. |
| 2003/0065544 A1 | 4/2003 | Elzinga et al. |
| 2003/0066031 A1 | 4/2003 | Laane |

(56) References Cited

U.S. PATENT DOCUMENTS

| | | |
|---|---|---|
| 2003/0074352 A1 | 4/2003 | Raboczi et al. |
| 2003/0074369 A1 | 4/2003 | Scheutze et al. |
| 2003/0084401 A1 | 5/2003 | Abel et al. |
| 2003/0093279 A1 | 5/2003 | Malah et al. |
| 2003/0098991 A1 | 5/2003 | Laverty et al. |
| 2003/0109951 A1 | 6/2003 | Hsiung et al. |
| 2003/0115281 A1 | 6/2003 | McHenry et al. |
| 2003/0135358 A1 | 7/2003 | Lissauer et al. |
| 2003/0152212 A1 | 8/2003 | Burok et al. |
| 2003/0154380 A1 | 8/2003 | Richmond et al. |
| 2003/0191626 A1 | 10/2003 | Al-Onaizan et al. |
| 2003/0198337 A1 | 10/2003 | Lenard |
| 2003/0200254 A1 | 10/2003 | Wei |
| 2003/0200371 A1 | 10/2003 | Abujbara |
| 2003/0202617 A1 | 10/2003 | Casper |
| 2003/0222680 A1 | 12/2003 | Jaussi |
| 2003/0229529 A1 | 12/2003 | Mui et al. |
| 2003/0229544 A1 | 12/2003 | Veres et al. |
| 2004/0003043 A1 | 1/2004 | Rajamony et al. |
| 2004/0021686 A1 | 2/2004 | Barberis |
| 2004/0024603 A1 | 2/2004 | Mahoney et al. |
| 2004/0034651 A1 | 2/2004 | Gupta et al. |
| 2004/0049479 A1 | 3/2004 | Dome et al. |
| 2004/0049509 A1 | 3/2004 | Keller et al. |
| 2004/0049580 A1 | 3/2004 | Boyd et al. |
| 2004/0054610 A1 | 3/2004 | Amstutz et al. |
| 2004/0064552 A1 | 4/2004 | Chong et al. |
| 2004/0068517 A1 | 4/2004 | Scott |
| 2004/0088199 A1 | 5/2004 | Childress et al. |
| 2004/0103014 A1 | 5/2004 | Teegan et al. |
| 2004/0117759 A1 | 6/2004 | Rippert et al. |
| 2004/0122652 A1 | 6/2004 | Andrews et al. |
| 2004/0133416 A1 | 7/2004 | Fukuoka et al. |
| 2004/0133876 A1 | 7/2004 | Sproule |
| 2004/0139021 A1 | 7/2004 | Reed et al. |
| 2004/0145607 A1 | 7/2004 | Alderson |
| 2004/0147138 A1 | 7/2004 | Vaartstra |
| 2004/0148152 A1 | 7/2004 | Horikawa |
| 2004/0148586 A1 | 7/2004 | Gilboa |
| 2004/0162812 A1 | 8/2004 | Lane et al. |
| 2004/0162822 A1 | 8/2004 | Papanyan et al. |
| 2004/0167765 A1 | 8/2004 | Abu El Ata |
| 2004/0205672 A1 | 10/2004 | Bates et al. |
| 2004/0220792 A1 | 11/2004 | Gallanis et al. |
| 2004/0236566 A1 | 11/2004 | Simske |
| 2004/0243587 A1 | 12/2004 | Nuyens et al. |
| 2004/0268221 A1 | 12/2004 | Wang |
| 2004/0268299 A1 | 12/2004 | Lei et al. |
| 2005/0027563 A1 | 2/2005 | Fackler et al. |
| 2005/0027871 A1 | 2/2005 | Bradley et al. |
| 2005/0039191 A1 | 2/2005 | Hewson et al. |
| 2005/0044198 A1 | 2/2005 | Okitsu et al. |
| 2005/0050000 A1 | 3/2005 | Kwok et al. |
| 2005/0055330 A1 | 3/2005 | Britton et al. |
| 2005/0059566 A1 | 3/2005 | Brown et al. |
| 2005/0060372 A1 | 3/2005 | DeBettencourt et al. |
| 2005/0071211 A1 | 3/2005 | Flockhart et al. |
| 2005/0096959 A1 | 5/2005 | Kumar et al. |
| 2005/0104628 A1 | 5/2005 | Tanzawa et al. |
| 2005/0125683 A1 | 6/2005 | Matsuyama et al. |
| 2005/0132048 A1 | 6/2005 | Kogan et al. |
| 2005/0138162 A1 | 6/2005 | Byrnes |
| 2005/0144023 A1 | 6/2005 | Aboujaoude et al. |
| 2005/0165823 A1 | 7/2005 | Ondrusek et al. |
| 2005/0198021 A1 | 9/2005 | Wilcox et al. |
| 2005/0216235 A1 | 9/2005 | Butt et al. |
| 2005/0222889 A1 | 10/2005 | Lai et al. |
| 2005/0228875 A1 | 10/2005 | Monitzer et al. |
| 2005/0234882 A1 | 10/2005 | Bennett et al. |
| 2005/0267770 A1 | 12/2005 | Banavar et al. |
| 2005/0288920 A1 | 12/2005 | Green et al. |
| 2006/0004845 A1 | 1/2006 | Kristiansen et al. |
| 2006/0015388 A1 | 1/2006 | Flockhart et al. |
| 2006/0020783 A1 | 1/2006 | Fisher |
| 2006/0041861 A1 | 2/2006 | Trefler et al. |
| 2006/0053125 A1 | 3/2006 | Scott |
| 2006/0063138 A1 | 3/2006 | Loff et al. |
| 2006/0064486 A1 | 3/2006 | Baron et al. |
| 2006/0064667 A1 | 3/2006 | Freitas |
| 2006/0075360 A1 | 4/2006 | Bixler |
| 2006/0080082 A1 | 4/2006 | Ravindra et al. |
| 2006/0080401 A1 | 4/2006 | Gill et al. |
| 2006/0092467 A1 | 5/2006 | Dumitrescu et al. |
| 2006/0100847 A1 | 5/2006 | McEntee et al. |
| 2006/0101386 A1 | 5/2006 | Gerken et al. |
| 2006/0101393 A1 | 5/2006 | Gerken et al. |
| 2006/0106846 A1 | 5/2006 | Schulz et al. |
| 2006/0139312 A1 | 6/2006 | Sinclair et al. |
| 2006/0149751 A1 | 7/2006 | Jade et al. |
| 2006/0167655 A1 | 7/2006 | Barrow et al. |
| 2006/0173724 A1 | 8/2006 | Trefler et al. |
| 2006/0173871 A1 | 8/2006 | Taniguchi et al. |
| 2006/0206303 A1 | 9/2006 | Kohlmeier et al. |
| 2006/0206305 A1 | 9/2006 | Kimura et al. |
| 2006/0209085 A1* | 9/2006 | Wong ............ G06T 11/206 345/629 |
| 2006/0218166 A1 | 9/2006 | Myers et al. |
| 2006/0271559 A1 | 11/2006 | Stavrakos et al. |
| 2006/0271920 A1 | 11/2006 | Abouelsaadat |
| 2006/0288348 A1 | 12/2006 | Kawamoto et al. |
| 2007/0005623 A1 | 1/2007 | Self et al. |
| 2007/0010991 A1 | 1/2007 | Lei et al. |
| 2007/0028225 A1 | 2/2007 | Whittaker et al. |
| 2007/0038765 A1 | 2/2007 | Dunn |
| 2007/0055938 A1 | 3/2007 | Herring et al. |
| 2007/0061789 A1 | 3/2007 | Kaneko et al. |
| 2007/0094199 A1 | 4/2007 | Deshpande et al. |
| 2007/0100782 A1 | 5/2007 | Reed et al. |
| 2007/0118497 A1 | 5/2007 | Katoh |
| 2007/0130130 A1 | 6/2007 | Chan et al. |
| 2007/0136068 A1 | 6/2007 | Horvitz |
| 2007/0143163 A1 | 6/2007 | Weiss et al. |
| 2007/0143851 A1 | 6/2007 | Nicodemus et al. |
| 2007/0203756 A1 | 8/2007 | Sears et al. |
| 2007/0208553 A1 | 9/2007 | Hastings et al. |
| 2007/0226031 A1 | 9/2007 | Manson et al. |
| 2007/0233902 A1 | 10/2007 | Trefler et al. |
| 2007/0239646 A1 | 10/2007 | Trefler |
| 2007/0245300 A1 | 10/2007 | Chan et al. |
| 2007/0260584 A1 | 11/2007 | Marti et al. |
| 2007/0294644 A1 | 12/2007 | Yost |
| 2008/0002823 A1 | 1/2008 | Fama et al. |
| 2008/0046462 A1 | 2/2008 | Kaufman et al. |
| 2008/0077384 A1 | 3/2008 | Agapi et al. |
| 2008/0085502 A1 | 4/2008 | Allen et al. |
| 2008/0109467 A1 | 5/2008 | Brookins et al. |
| 2008/0120593 A1 | 5/2008 | Keren et al. |
| 2008/0163253 A1 | 7/2008 | Massmann et al. |
| 2008/0184230 A1 | 7/2008 | Leech et al. |
| 2008/0189679 A1 | 8/2008 | Rodriguez et al. |
| 2008/0195377 A1 | 8/2008 | Kato et al. |
| 2008/0196003 A1 | 8/2008 | Gerken et al. |
| 2008/0208785 A1 | 8/2008 | Trefler et al. |
| 2008/0216055 A1 | 9/2008 | Khatutsky |
| 2008/0216060 A1 | 9/2008 | Vargas |
| 2008/0263510 A1 | 10/2008 | Nerome et al. |
| 2008/0297482 A1* | 12/2008 | Weiss ............ G06F 3/04883 345/173 |
| 2009/0007084 A1 | 1/2009 | Conallen et al. |
| 2009/0018998 A1 | 1/2009 | Patten, Jr. et al. |
| 2009/0075634 A1 | 3/2009 | Sinclair et al. |
| 2009/0083697 A1 | 3/2009 | Zhang et al. |
| 2009/0132232 A1 | 5/2009 | Trefler |
| 2009/0132996 A1 | 5/2009 | Eldridge et al. |
| 2009/0138844 A1 | 5/2009 | Halberstadt et al. |
| 2009/0150541 A1 | 6/2009 | Georgis |
| 2009/0158213 A1* | 6/2009 | Ryu ............... H04M 1/7258 715/825 |
| 2009/0158407 A1 | 6/2009 | Nicodemus et al. |
| 2009/0164494 A1 | 6/2009 | Dodin |
| 2009/0171938 A1 | 7/2009 | Levin et al. |
| 2009/0199123 A1* | 8/2009 | Albertson ...... G06F 3/04845 715/772 |

(56) References Cited

U.S. PATENT DOCUMENTS

| | | | |
|---|---|---|---|
| 2009/0228786 A1* | 9/2009 | Danton | G06T 11/206 715/243 |
| 2009/0276206 A1 | 11/2009 | Fitzpatrick et al. | |
| 2009/0282384 A1 | 11/2009 | Keppler | |
| 2009/0319948 A1* | 12/2009 | Stannard | G06F 8/34 715/810 |
| 2010/0011338 A1 | 1/2010 | Lewis | |
| 2010/0088266 A1 | 4/2010 | Trefler | |
| 2010/0107137 A1 | 4/2010 | Trefler et al. | |
| 2010/0149109 A1* | 6/2010 | Elias | G06F 3/04845 345/173 |
| 2010/0217737 A1 | 8/2010 | Shama | |
| 2011/0016422 A1* | 1/2011 | Miyazawa | G06F 3/0488 715/788 |
| 2011/0066486 A1 | 3/2011 | Bassin et al. | |
| 2011/0072373 A1* | 3/2011 | Yuki | G06F 3/04817 715/764 |
| 2011/0148791 A1* | 6/2011 | Luu | G06F 3/04883 345/173 |
| 2011/0239113 A1 | 9/2011 | Hung et al. | |
| 2011/0252305 A1 | 10/2011 | Tschani et al. | |
| 2011/0264251 A1 | 10/2011 | Copello et al. | |
| 2012/0041921 A1 | 2/2012 | Canaday et al. | |
| 2012/0050530 A1* | 3/2012 | Raman | G06F 3/017 348/142 |
| 2012/0102420 A1 | 4/2012 | Fukahori | |
| 2012/0272186 A1* | 10/2012 | Kraut | G06F 3/0488 715/810 |
| 2012/0290939 A1* | 11/2012 | Yu | G06F 21/36 715/741 |
| 2012/0293558 A1* | 11/2012 | Dilts | G09G 5/24 345/676 |
| 2012/0306773 A1* | 12/2012 | Yeung | G06F 1/1616 345/173 |
| 2013/0007267 A1 | 1/2013 | Khatutsky | |
| 2013/0031455 A1 | 1/2013 | Griffiths et al. | |
| 2013/0047165 A1 | 2/2013 | Goetz et al. | |
| 2013/0067392 A1* | 3/2013 | Leonard | G06F 3/0488 715/784 |
| 2013/0120319 A1* | 5/2013 | Givon | G06F 3/0425 345/175 |
| 2013/0120434 A1* | 5/2013 | Kim | G06F 3/04883 345/594 |
| 2013/0135294 A1* | 5/2013 | An | G06F 3/0488 345/419 |
| 2013/0159904 A1* | 6/2013 | Kelappan | G06F 3/0481 715/769 |
| 2013/0167245 A1 | 6/2013 | Birtwhistle et al. | |
| 2013/0179816 A1* | 7/2013 | Seo | G06F 3/04842 715/770 |
| 2013/0231970 A1 | 9/2013 | Trefler et al. | |
| 2013/0254833 A1 | 9/2013 | Nicodemus et al. | |
| 2013/0290249 A1 | 10/2013 | Merriman et al. | |
| 2013/0335339 A1* | 12/2013 | Maunder | G06F 3/0488 345/173 |
| 2014/0019400 A1 | 1/2014 | Trefler et al. | |
| 2014/0082539 A1* | 3/2014 | Tjissen | G06F 3/0488 715/770 |
| 2014/0089819 A1* | 3/2014 | Andler | G06Q 50/01 715/753 |
| 2014/0125577 A1* | 5/2014 | Hoang | G06F 3/017 345/156 |
| 2014/0137019 A1* | 5/2014 | Paulsen | G06F 3/0486 715/769 |
| 2014/0258860 A1* | 9/2014 | Subramanian | G06F 3/016 715/716 |
| 2014/0277164 A1 | 9/2014 | Ramsay et al. | |
| 2014/0313135 A1* | 10/2014 | Pisters | G06F 3/0484 345/173 |
| 2014/0325410 A1* | 10/2014 | Jung | G06F 3/0488 715/765 |
| 2015/0058772 A1* | 2/2015 | Bator | G06T 11/206 715/769 |
| 2015/0074606 A1* | 3/2015 | Melen | G06F 3/0484 715/835 |
| 2015/0089406 A1 | 3/2015 | Trefler et al. | |
| 2015/0127736 A1 | 5/2015 | Clinton et al. | |
| 2016/0041961 A1 | 2/2016 | Romney | |
| 2016/0070560 A1 | 3/2016 | Chase | |
| 2016/0085809 A1 | 3/2016 | de Castro Alves et al. | |
| 2016/0098298 A1 | 4/2016 | Trefler et al. | |
| 2016/0105370 A1 | 4/2016 | Mellor et al. | |
| 2017/0013073 A1 | 1/2017 | Mendez et al. | |
| 2017/0109032 A1* | 4/2017 | MeLinand | G06F 3/04817 |
| 2017/0242582 A1* | 8/2017 | Yaremko | G06F 3/0488 |
| 2017/0255341 A1 | 9/2017 | Trefler et al. | |
| 2017/0351425 A1 | 12/2017 | D'angelo et al. | |
| 2017/0357703 A1 | 12/2017 | Theimer et al. | |
| 2018/0011678 A1 | 1/2018 | Shipper et al. | |
| 2018/0024901 A1 | 1/2018 | Tankersley et al. | |
| 2018/0067580 A1* | 3/2018 | Bonnery | G06F 3/044 |

FOREIGN PATENT DOCUMENTS

| | | |
|---|---|---|
| EP | 0 669 717 A1 | 8/1995 |
| EP | 0 996 916 A1 | 5/2000 |
| EP | 1 015 997 A2 | 7/2000 |
| EP | 1 019 807 A2 | 7/2000 |
| EP | 1 073 955 A1 | 2/2001 |
| EP | 1 073 992 A1 | 2/2001 |
| EP | 1 135 723 A1 | 9/2001 |
| EP | 1 163 604 A2 | 12/2001 |
| EP | 1 183 636 A1 | 3/2002 |
| EP | 1 196 882 A1 | 4/2002 |
| EP | 1 203 310 A1 | 5/2002 |
| EP | 1 208 482 A1 | 5/2002 |
| EP | 1 212 668 A2 | 6/2002 |
| EP | 1 240 592 A1 | 9/2002 |
| EP | 1 277 102 A2 | 1/2003 |
| EP | 1 277 119 A1 | 1/2003 |
| EP | 1 277 120 A1 | 1/2003 |
| EP | 1 277 153 A1 | 1/2003 |
| EP | 1 277 155 A1 | 1/2003 |
| EP | 1 277 329 A1 | 1/2003 |
| EP | 1 374 083 A1 | 1/2004 |
| EP | 1 382 030 A2 | 1/2004 |
| EP | 1 386 241 A1 | 2/2004 |
| EP | 1 393 172 A2 | 3/2004 |
| EP | 1 393 188 A1 | 3/2004 |
| EP | 1 402 336 A2 | 3/2004 |
| EP | 1 407 384 A1 | 4/2004 |
| EP | 1 430 396 A1 | 6/2004 |
| EP | 1 438 649 A1 | 7/2004 |
| EP | 1 438 654 A1 | 7/2004 |
| EP | 1 438 672 A1 | 7/2004 |
| EP | 1 483 685 A1 | 12/2004 |
| EP | 1 490 747 A1 | 12/2004 |
| EP | 1 490 809 A1 | 12/2004 |
| EP | 1 492 232 A1 | 12/2004 |
| EP | 1 782 183 A2 | 5/2007 |
| EP | 1 830 312 A1 | 9/2007 |
| EP | 1 840 803 A1 | 10/2007 |
| EP | 2 115 581 A1 | 11/2009 |
| WO | 98/38564 A2 | 9/1998 |
| WO | 98/40807 A2 | 9/1998 |
| WO | 99/05632 A1 | 2/1999 |
| WO | 99/45465 A1 | 9/1999 |
| WO | 99/50784 A1 | 10/1999 |
| WO | 00/33187 A1 | 6/2000 |
| WO | 00/33217 A1 | 6/2000 |
| WO | 00/33226 A1 | 6/2000 |
| WO | 00/33235 A1 | 6/2000 |
| WO | 00/33238 A2 | 6/2000 |
| WO | 00/52553 A2 | 9/2000 |
| WO | 00/52603 A1 | 9/2000 |
| WO | 00/67194 A2 | 11/2000 |
| WO | 01/40958 A1 | 6/2001 |
| WO | 01/75610 A1 | 10/2001 |
| WO | 01/75614 A1 | 10/2001 |
| WO | 01/75747 A1 | 10/2001 |
| WO | 01/75748 A1 | 10/2001 |
| WO | 01/76206 A1 | 10/2001 |

(56) References Cited

FOREIGN PATENT DOCUMENTS

| | | |
|---|---|---|
| WO | 01/77787 A2 | 10/2001 |
| WO | 01/79994 A2 | 10/2001 |
| WO | 02/021254 A2 | 3/2002 |
| WO | 02/044947 A2 | 6/2002 |
| WO | 02/056249 A2 | 7/2002 |
| WO | 02/080006 A1 | 10/2002 |
| WO | 02/080015 A1 | 10/2002 |
| WO | 02/082300 A1 | 10/2002 |
| WO | 02/084925 A2 | 10/2002 |
| WO | 02/088869 A2 | 11/2002 |
| WO | 02/091346 A1 | 11/2002 |
| WO | 02/101517 A2 | 12/2002 |
| WO | 02/103576 A1 | 12/2002 |
| WO | 03/021393 A2 | 3/2003 |
| WO | 03/029923 A2 | 4/2003 |
| WO | 03/029955 A1 | 4/2003 |
| WO | 03/030005 A1 | 4/2003 |
| WO | 03/030013 A1 | 4/2003 |
| WO | 03/030014 A1 | 4/2003 |
| WO | 03/058504 A1 | 7/2003 |
| WO | 03/069500 A1 | 8/2003 |
| WO | 03/071380 A2 | 8/2003 |
| WO | 03/071388 A2 | 8/2003 |
| WO | 03/073319 A2 | 9/2003 |
| WO | 03/077139 A1 | 9/2003 |
| WO | 03/085503 A1 | 10/2003 |
| WO | 03/085580 A1 | 10/2003 |
| WO | 2004/001613 A1 | 12/2003 |
| WO | 2004/003684 A2 | 1/2004 |
| WO | 2004/003766 A1 | 1/2004 |
| WO | 2004/003885 A1 | 1/2004 |
| WO | 2004/046882 A2 | 6/2004 |
| WO | 2004/061815 A1 | 7/2004 |
| WO | 2004/086197 A2 | 10/2004 |
| WO | 2004/086198 A2 | 10/2004 |
| WO | 2004/095207 A2 | 11/2004 |
| WO | 2004/095208 A2 | 11/2004 |
| WO | 2004/114147 A1 | 12/2004 |
| WO | 2005/001627 A2 | 1/2005 |
| WO | 2005/003888 A2 | 1/2005 |
| WO | 2005/010645 A2 | 2/2005 |
| WO | 2005/117549 A2 | 12/2005 |
| WO | 2006/081536 A2 | 8/2006 |
| WO | 2007/033922 A2 | 3/2007 |
| WO | 2008/109441 A1 | 9/2008 |
| WO | 2009/097384 A1 | 8/2009 |

OTHER PUBLICATIONS

International Preliminary Report on Patentability for Application No. PCT/US2004/020783, dated Feb. 13, 2006 (6 pages).
International Search Report for PCT/US05/018599, dated May 15, 2007 (1 page).
International Preliminary Report on Patentability for PCT/US2005/018599, dated Jun. 5, 2007 (10 pages).
International Search Report & Written Opinion for PCT/US06/03160, dated Jul. 21, 2008 (16 pages).
International Preliminary Report on Patentability for PCT/US06/03160, dated Apr. 9, 2009 (14 pages).
International Search Report for PCT/US08/55503, dated Jul. 28, 2008 (1 page).
International Preliminary Report on Patentability for PCT/US2008/055503, dated Sep. 17, 2009 (4 pages).
International Search Report & Written Opinion for PCT/US09/32341, dated Mar. 11, 2009 (14 pages).
International Preliminary Report on Patentability for PCT/US2009/032341, dated Aug. 12, 2010 (8 pages).
Johnson et al., Sharing and resuing rules-a feature comparison of five expert system shells. IEEE Expert, IEEE Services Center, New York, NY, vol. 9, No. 3, Jun. 1, 1994, pp. 3-17.
Jones et al., A user-centered approach to functions in excel. International Conference on Functional Programming, Uppsala, Jun. 30, 2003, pp. 1-12.
Kappel, G., et al., TriGSflow active object-oriented workflow management. Proceedings of the 28th Annual Hawaii International Conference on System Sciences. 1995, pp. 727-736.
Kim, W., Object-Oriented Databases: Definition and Research Directions, IEEE Trans. on Knowledge and Data Engineering, vol. 2(3) pp. 327-341, Sep. 1990.
Kuhn, H.W., The Hungarian Method for the Assignment Problem, Naval Research Logistics Quarterly, 2 (1955), pp. 83-97.
Kuno, H.A., and E.A. Rundensteiner, Augmented Inherited Multi-Index Structure for Maintenance of Materialized Path Query Views, Proc. Sixth Int'l. Workshop on Research Issues in Data Engineering, pp. 128-137, Feb. 1996.
LaRue, J., Leveraging Integration and Workflow. Integrated Solutions, Accounting Today, SourceMedia, Aug. 2006, pp. 18-19.
Lippert, Enc, Fabulous Adventures in Coding: Metaprogramming, Toast and the Future of Development Tools, Microsoft.com Blog, MSDN Home, published Mar. 4, 2004, 6 pgs.
Mandal, et al., Integrating existing scientific workflow systems: The kepler/pegasus example. USC Information Sciences Institute, 2007, 8 pages.
Manghi, Paolo, et. al., Hybrid Applications Over XML: Integrating the Procedural and Declarative Approaches, 2002 ACM, pp. 1-6. Retrieved Mar. 22, 2007.
Manolescu, D.A., et al., Dynamic object model and adaptive workflow. Proceedings of Metadata and Active Object-Model Pattern Mining Workshop co-located with OOPSLA, 1999, vol. 99, 19 pages.
Markiewicz, M.E., et al., Object oriented framework development. ACM, 2001, 13 pages, <http://dl.acm.org/citation.cfm?id=372771>.
Markowitz, V.M., and A. Shoshani, Object Queries over Relational Databases: Language, Implementation, and Applications, IEEE Xplore, pp. 71-80, Apr. 1993.
Marmel, Elaine, Microsoft Office Project 2007 Bible, ISBN 0470009926, Wiley Publishing, Inc., 2007, 961 pages.
Maryanski, F., et al., The Data Model Compiler: A Tool for Generating Object-Oriented Database Systems, 1986 Int'l. Workshop on Object-Oriented Database Systems, IEEE, 73-84 (1986).
McConnell, Steven C., Brooks' Law Repealed, IEEE Software, pp. 6-9, Nov./Dec. 1999.
Mecca, G., et al., Cut and Paste, ACM, pp. 1-25 and Appendix I-IV (Jun. 1999). Retrieved Mar. 22, 2007.
Mitchell, T.M., Machine Learning, Chapter 3, 1997, McGraw-Hill, pp. 52-80.
Mitchell, T.M., Machine Learning, Chapter 6, 1997, McGraw-Hill, pp. 154-200.
Morizet-Mahoudeaux, P., A Hierarchy of Network-Based Knowledge Systems, IEEE Trans. on Systems, Man, and Cybernetics, vol. 21(5), pp. 1184-1191, Sep./Oct. 1991.
Pientka, B., et al., Programming with proofs and explicit contexts. International Symposium on Principles and Practice of Declarative Programming, ACM, 2008, pp. 163-173, <http://delivery.acm.org/10.1145/1390000/1389469/p163-pientka.pdf?>.
Reinersten, Don, Is It Always a Bad Idea to Add Resources to a Late Project?, Oct. 30, 2000. Electronic Design. vol. 48, Issue 22, p. 70.
Riccuiti, M., Oracle 8.0 on the way with objects: upgrade will also build in multidimensional engine. InfoWorld. Sep. 25, 1995;17(39):16.
Richner, T., et al., Recovering high-level views of object-oriented applications from static and dynamic information. IEEE, 1999, 10 pages, <http://ieeexploreieee.org/stamp/stamp.jsp?tp=&arnumber=792487>.
Saiz, Francisco, et al. Rule-Based Web Page Generation, Proceedings of the 2nd Workshop on Adaptive Hypertext and Hypermedia, Hypertext'98, Jun. 20-24, 1998, 9 pages.
Salvini, S., and M.H. Williams, Knowledge Management for Expert Systems, IEEE Colloquium on 'Knowledge Engineering', 3 pages, May 1990.
Schiefelbein, Mark, A Backbase Ajax Front-end for J2EE Applications, Internet Article, dev2dev <http://dev2dev.bea.com/1pt/a/433>, Aug. 29, 2005, 16 pages.
Schulze, W., Filling the workflow management facility into the object management architecture. Business Object Design and Implementation II. Springer London, 1998, pp. 109-117.

(56) References Cited

OTHER PUBLICATIONS

Sellis, T., et al., Coupling Production Systems and Database Systems: A Homogeneous Approach, IEEE Trans. on Knowledge and Data Engineering, vol. 5(2), pp. 240-256, Apr. 1993.
Shyy Y.M., and S.Y.W. Su, Refinement Preservation for Rule Selection in Active Object-Oriented Database Systems, Proc. Fourth Int'l. Workshop on Research Issues in Data Engineering, pp. 115-123, Feb. 1994.
Simpson, Alan, et al., Access 97 for Windows 95/NT; 1997 SYBEX; 16 pages; USPTO STIC-EIC 2100/2400.
Singh, G., et al., Workflow task clustering for best effort systems with pegasus, Pegasus, 2008, 8 pages.
Smedley, T.J. et al., "Expanding the Utility of Spreadsheets Through the Integration of Visual Programming and User Interface Objects," School of Computer Science, Technical University of Nova Scotia, ACM, 1996; pp. 148-155.
Srinivasan, V., et al., Object persistence in object-oriented applications. IBM Systems Journal, 1997, vol. 36, issue 1, pp. 66-87, <http://ieeexplore.ieee.org/stamp/stamp.jsp?tp=&arnumber-5387186>.
Stonebraker, M., The Integration of Rule Systems and Database Systems, IEEE Trans. on Knowledge and Data Engineering, vol. 4(5), pp. 415-423, Oct. 1992.
Sun, et al., "Supporting Inheritance in Relational Database Systems," IEEE, pp. 511-518, Jun. 1992.
Surjanto, B., XML content management based on object-relational database technology. Proceedings of the First International Conference on Web Information Systems Engineering, IEEE, 2000, Jun. 19-21, 2000, vol. 1, pp. 70-79.
Thuraisingham, "From Rules to Frames and Frames to Rules," AI Expert, pp. 31-39, Oct. 1989.
Vranes, S., et al., Integrating Multiple Paradigms within the Blackboard Framework, IEEE Transactions on Software Engineering, vol. 21, No. 3, Mar. 1995, pp. 244-262.
Yang, Bibo; Geunes, Joseph; O'Brien, William J.; Resource-Constrained Project Scheduling: Past Work and New Directions, Apr. 2001, 28 pages, Research Report Jun. 2001, Department of Industrial and Systems Engineering, University of Florida.
[No Author Listed] About the Integrated Work Manager (IWM). Pegasystems, Inc., Apr. 30, 2009, 3 pages, <http://pdn-dev/DevNet/PRPCv5/KB/TMP9ad01zurnf.asp>.
[No Author Listed] FreeBSD Project. "EDQUOTA(8)" in Free BSD System Managers Manual. FreeBSD 8.2 Jun. 6, 1993. pp. 1-2. Retrieved from freebsd.org on Oct. 27, 2011.
[No Author Listed] How SmartForms for Blaze Advisor works, Fair Issac White Paper, http://www.FAIRISAAC.COM/, Oct. 31, 2005, 8 pages (website no longer active).
[No Author Listed] How to Configure and Customize the Universal Worklist. SAP Netweaver '04 and SAP Enterprise Portal 6.0. SAP AG. Version 1, May 2004, 65 pages. <http://www.erpgenie.com/sap/netweaver/ep/Configuring%20the%20UWL.pdf>.
[No Author Listed] How to configure the IWM/IAC gateway. Pegasystems, Inc., Apr. 30, 2009, 4 pages, <http://pdn-dev/DevNet/PRPCv5/KB/TMP9cf8fzurq4.asp>.
[No Author Listed] How to install the Integrated Work Manager (IWM). Pegasystems, Inc., Apr. 30, 2009, 6 pages, <http://pdn-dev/DevNet/PRPCv5/KB/TMP9br1ezurp8.asp>.
[No Author Listed] HP Integrated Lights-Out 2, User Guide, Part No. 394326-004, HP, Aug. 2006, 189 pages.
[No Author Listed] Integrating with External Systems, PegaRULES Process Commander 5.2. Process Commander 5.2 reference. Pegasystems Inc, Cambridge, MA, 2006, 103 pages <http://pdn.pega.com/ProductSupport/Products/PegaRULESProcessCommander/documents/PRPC/V5/502/iwes/PRPC52_Integrating_with_External_Systems.pdf>.
[No Author Listed] IP Prior Art Database, Options when returning work items in workflow management systems. IBM, IPCOM000027980D, 2004, 3 pages.
[No Author Listed] IP Prior Art Database, Staff Queries and Assignments in Workflow Systems. IBM, IPCOM000142382D, 2006, 4 pages.
[No Author Listed] IP Prior Art Database, Using work items to manage user interactions with adaptive business services. IBM TDB, IPCOM000015953D, 2003, 4 pages.
[No Author Listed] Localizing an Application, PegaRULES Process Commander. Process Commander 4.2 reference. Pegasystems Inc., Cambdrige, MA, 2006, 92 pages <http://pdn.pega.com/DevNet/PRPCv4/TechnologyPapers/documents/Localization0402.pdf>.
[No Author Listed] Oracle Universal Work Queue: Implementation Guide. Release 11i for Windows NT. Oracle Corporation. Jul. 2001, 136 pages. <http://docs.oracle.com/cd/A85964_01/acrobat/ieu115ug.pdf>.
[No Author Listed] Solaris 9 resource manager software. A technical white paper. Sun Microsystems, Inc., Palo Alto CA, 2002, 37 pages. XP-002291080. Retrieved Aug. 3, 2004 from <http://wwws.sun.com/software/whitepapers/solaris9/srm.pdf>.
Bertino, E., and P. Foscoli, Index Organizations for Object-Oriented Database Systems, IEEE Trans. on Knowledge and Data Engineering, 7(2):193-209 (Apr. 1995).
Bierbaum, A., et al., VR juggler: A virtual platform for virtual reality application development. Proceedings of the Virtual Reality 2001 Conference, IEEE, 2001, 8 pages, <http://ieeexplore.ieee.org/stamp/stamp.jsp?tp=&arnumber-913774>.
Breiman, L., Bagging predictors, Machine Learning, vol. 24, No. 2, Aug. 31, 1996, pp. 123-140, Kluwer Academic Publishers, Netherlands.
Brusilovsky, P., and De Bra, P., Editors, "Second Workshop on Adaptive Hypertext and Hypermedia Proceedings," Jun. 20-24, 1998. Ninth ACM Conference on Hypertext and Hypermedia, Hypertext'98. pp. 1-2.
Burleson, D., Adding behaviors to relational databases, DBMS, 8(10): 68(5) (Sep. 1995).
Busse, Ralph et al., Declarative and Procedural Object Oriented Views, IEEE, 1998, pp. 570-578, retrieved Mar. 22, 2007.
Buyya et al., Economic Models for Resource Management and Scheduling in Grid Computing, Concurrency and Computation: Practice and Experience, 2002, vol. 14, pp. 1507-1542.
Ceri, S., et al., WIDE—A distributed architecture for workflow management. Proceedings. Seventh International Workshop on Research Issues in Data Engineering, IEEE, 1997, pp. 76-79, 1997.
Chan, T.W., and W. Hwang, Towards Integrating Logic, Object, Frame, and Production, Proc. Fourth Int'l. Conf. on Software Engineering and Knowledge Engineering, IEEE, pp. 463-469, Jun. 1992.
Cheng, Cheng-Chung; Smith, Stephen F.; A Constraint Satisfaction Approach to Makespan Scheduling, AIPS 1996 Proceedings, pp. 45-52 (1996).
Cheng, C.C. and Smith, Applying Constraint Satisfaction Techniques to Job Shop Scheduling, Annals of Operations Research, 70: 327-357 (1997).
Cochrane, Roberta et al., Integrating Triggers and Declarative Constraints in SQL Database Systems, pp. 567-578, Proceedings of the 22nd VLDB Conference Mumbai (Bombay), India, 1996, retrieved Mar. 22, 2007.
Damerau, F.J., Problems and some solutions in customization of natural language database front ends. ACM Transactions on Office Information Systems, vol. 3, No. 2, Apr. 1, 1985, pp. 165-184.
Danforth, S., Integrating Object and Relational Technologies, Proc. Sixteenth Annual Intl. Computer Software and Applications Conf., IEEE Comput. Soc. Press, pp. 225-226, Sep. 1992 (Abstract).
Deelman, E., et al., Pegasus: A framework for mapping complex scientific workflows onto distributed systems, submitted to Scientific Programming, Jan. 2005. Pre journal publication copy of article, 22 pages.
Deelman, E., et al., Pegasus: A framework for mapping complex scientific workflows onto distributed systems. Scientific Programming, 13, pp. 219-237, 2005.
Deelman, E., et al., Workflows and e-science: An overview of workflow system features and capabilities. Future Generation Computer Systems, May 2009, vol. 25, issue 5, pp. 528-540.

(56) References Cited

OTHER PUBLICATIONS

DeMichiel, L.G., et al., Polyglot: Extensions to Relational Databases for Sharable Types and Functions in a Multi-Language Environment, Proc. Ninth Int'l. Conf. on Data Engineering, IEEE, pp. 651-660, Apr. 1993.
Devarakonda et al., Predictability of process resource usage: A measurement-based study on UNIX. IEEE Transactions on Software Engineering. 1989;15(12):1579-1586.
Eisenstein, et al., Adaptation in Automated User-Interface Design. IUI, 2000, pp. 74-81.
Communication for European Patent Application No. 05755530.2, dated Sep. 6, 2007 (2 pages).
European Search Report for Application No. 05755530.2, dated Mar. 26, 2012 (3 Pages).
European Office Action dated Aug. 31, 2012 for Application No. 05755530.2 (4 Pages).
Communication for European Patent Application No. 07250844.3 enclosing European Search Report, dated Jul. 11, 2007 (6 pages).
Communication for European Patent Application No. 07250844.3, dated Mar. 28, 2008 (1 page).
European Office Action dated Jul. 9, 2012 for Application No. 07250844.3 (8 Pages).
Communication for European Patent Application No. 07250848.4, dated Aug. 13, 2007 (EESR enclosed) (6 pages).
Communication for European Patent Application No. 07250848.4, dated May 29, 2008 (1 page).
Communication for European Patent Application No. 08731127.0, dated Oct. 13, 2009 (2 pages).
Extended European Search Report dated Oct. 29, 2012 for Application No. 08731127.0 (8 Pages).
Extended European Search Report for Application No. 15189385.6, dated Dec. 17, 2015 (9 pages).
Fayad, M.E., et al., Object-oriented application frameworks. Communications of the ACM, Oct. 1997, vol. 40, Issue 10, pp. 32-38, <http://dl.acm.org/citation.cfm?id=262798>.
Sajos et al. SUPPLE: Automatically Generating User Interfaces. IUI 2004, 8 pages.
Hague, Darren, Universal Worklist with SAP Netweaver Portal. Galileo Press, 2008, pp. 11-31. <http://www.sap-hefte.de/download/dateien/1461/146_leseprobe.pdf>.
International Search Report and Written Opinion for Application No. PCT/GB2004/000677, dated Aug. 2, 2004 (15 pages).
International Search Report for Application No. PCT/US2004/020783, dated Nov. 8, 2005 (2 pages).
U.S. Appl. No. 08/666,165, filed Jun. 19, 1996, Rules Bases and Methods of Access Thereof.
U.S. Appl. No. 10/430,693, filed May 6, 2003, Methods and Apparatus for Digital Data Processing With Mutable Inheritance.
U.S. Appl. No. 10/547,014, filed Aug. 25, 2005, Classification Using Probability Estimate Re-Sampling.
U.S. Appl. No. 10/639,735, filed Aug. 12, 2003, Process/Viewer Interface.
U.S. Appl. No. 10/854,017, filed May 26, 2004, Integration of Declarative Rule-Based Processing With Procedural Programming.
U.S. Appl. No. 11/046,211, filed Jan. 28, 2005, Methods and Apparatus for Work Management and Routing.
U.S. Appl. No. 11/203,513, filed Aug. 12, 2005, Methods and Apparatus for Digital Data Processing With Mutable Inheritance.
U.S. Appl. No. 11/368,360, filed Mar. 3, 2006, Rules Base Systems and Methods With Circumstance Translation.
U.S. Appl. No. 11/396,415, filed Mar. 30, 2006, User Interface Methods and Apparatus for Rules Processing.
U.S. Appl. No. 11/681,269, filed Mar. 2, 2007, Proactive Performance Management for Multi-User Enterprise Software Systems.
U.S. Appl. No. 12/035,682, filed Feb. 22, 2008, User Interface Methods and Apparatus for Rules Processing.
U.S. Appl. No. 12/174,624, filed Jul. 16, 2008, Methods and Apparatus for Implementing Multilingual Software Applications.
U.S. Appl. No. 12/381,523, filed Mar. 12, 2009, Techniques for Dynamic Data Processing.
U.S. Appl. No. 12/386,959, filed Apr. 24, 2009, Method and Apparatus for Integrated Work Management.
U.S. Appl. No. 12/590,454, filed Nov. 6, 2009, Techniques for Content-Based Caching in a Computer System.
U.S. Appl. No. 12/619,215, filed Nov. 16, 2009, Rules Base Systems and Methods With Circumstance Translation.
U.S. Appl. No. 12/649,095, filed Dec. 29, 2009, Methods and Apparatus for Integration of Declarative Rule-Based Processing With Procedural Programming in a Digital Data-Processing Evironment.
U.S. Appl. No. 12/798,161, filed Mar. 30, 2010, System and Method for Creation and Modification of Software Applications.
U.S. Appl. No. 13/031,097, filed Feb. 18, 2011, Systems and Methods for Distributed Rules Processing.
U.S. Appl. No. 13/031,109, filed Feb. 18, 2011, Rule-Based User Interface Conformance Methods.
U.S. Appl. No. 13/341,411. filed Dec. 30, 2011, System and Method for Updating or Modifying an Application Without Manual Coding.
U.S. Appl. No. 13/536,079, filed Jun. 28, 2012, Proactive Performance Management for Multi-User Enterprise Software Systems.
U.S. Appl. No. 13/718,255, filed Dec. 18, 2012, Methods and Apparatus for Work Management and Routing.
U.S. Appl. No. 13/892,956, filed May 13, 2013, Content-Based Caching Using a Content Identifier at a Point in Time.
U.S. Appl. No. 13/897,763, filed May 20, 2013, System and Software for Creation and Modification of Software.
U.S. Appl. No. 13/907,287, filed May 31, 2013, Methods and Apparatus for Integration of Declarative Rule-Based Processing With Procedural Programming in a Digital Data-Processing Environment.
U.S. Appl. No. 14/469,208, filed Aug. 26, 2014, Techniques for Dynamic Data Processing.
U.S. Appl. No. 14/527,348, filed Oct. 29, 2014, Systems and Methods for Distributed Rules Processing.
U.S. Appl. No. 14/558,084, filed Dec. 2, 2014, Methods and Apparatus for User Interface Optimization.
U.S. Appl. No. 14/597,207, filed Jan. 14, 2015, Methods and Apparatus for Integrated Work Management.
U.S. Appl. No. 14/879,679, filed Oct. 9, 2015. Event Processing With Enhanced Throughput.
U.S. Appl. No. 14/928,085, filed Oct. 30, 2015, System and Method for Updating or Modifying an Application Without Manual Coding.
U.S. Appl. No. 15/206,956, filed Jul. 11, 2016, Selective Sharing for Collaborative Application Usage.
U.S. Appl. No. 15/602,880, filed May 23, 2017, Methods and Apparatus for User Interface Optimization.

\* cited by examiner

CONNECTING GRAPHICAL SHAPES USING GESTURES

CROSS-REFERENCE TO RELATED APPLICATIONS

This application claims the benefit of priority under 35 U.S.C. § 119(e) of U.S. Provisional Patent Application Ser. No. 62/345,367, filed Jun. 3, 2016 and entitled "Connecting Graphical Shapes Using Gestures," the entire contents of which are incorporated herein by reference.

FIELD OF THE DISCLOSURE

The present disclosure relates to digital data processing, and more particularly, to methods, apparatus, systems, and computer-readable media for connecting graphical shapes. The teachings herein have application, by way of non-limiting example, to rapid and improved generation of graphical connectors in diagramming applications.

BACKGROUND

Applications typically provide graphical shapes and connectors on a virtual canvas to generate diagrams. In creating business process flows, flowcharts, or illustrations, applications provide connectors to represent relationships between two or more graphical shapes. To generate a connector between graphical shapes, traditional applications typically require users to select a connector tool, select a first shape, and drag toward a second shape using, for example, a mouse pointer, cursor, or finger.

An object of this invention is to provide improved systems and methods for digital data processing. A more particular object is to provide improved systems and methods for connecting graphical shapes.

A further object is to provide such improved systems and methods as facilitate connecting graphical shapes using rapid and intuitive gestures.

SUMMARY

The foregoing are among the objects attained by the invention which provides, in one aspect, a digital data processing system, apparatus, method, and computer-readable medium for connecting graphical shapes.

In some embodiments, the system includes a client apparatus. The client apparatus includes a display and a client digital data processor. The display is configured to present a source graphical shape and a target graphical shape. The client digital data processor is in communicative coupling with the display. The client digital data processor is configured to receive one or more selection events tracking one or more input locations. The client digital data processor is further configured to identify the source graphical shape and the target graphical shape based at least on the received selection events. The client digital data processor is still further configured to determine a source connection point and a target connection point for a connector based at least on the source graphical shape and the target graphical shape. The client digital data processor is yet further configured to determine a length for the connector based at least on the source connection point and the target connection point. The client digital data processor is still further configured to generate and display, on the display, the connector based at least on the source connection point, the target connection point, and the length.

Further aspects of the invention provide a method for connecting graphical shapes, the method comprising the steps of identifying a source graphical shape and a target graphical shape based at least on one or more received selection events tracking one or more input locations; determining a source connection point and a target connection point for a connector based at least on the source graphical shape and the target graphical shape; determining a length for the connector based at least on the source connection point and the target connection point; and generating and displaying the connector based at least on the source connection point, the target connection point, and the length.

The invention provides, in further aspects, a non-transitory computer-readable medium having stored therein a computer program product having instructions, which when executed by a client digital data processor cause the client digital data processor to: identify a source graphical shape and a target graphical shape based at least on one or more received selection events tracking one or more input locations; determine a source connection point and a target connection point for a connector based at least on the source graphical shape and the target graphical shape; determine a length for the connector based at least on the source connection point and the target connection point; and generate and display the connector based at least on the source connection point, the target connection point, and the length.

In related aspects, the one or more selection events include one or more of: a single tap; a long tap held for any of microseconds, milliseconds, and seconds; and a multi-touch event indicating a plurality of input locations.

In further related aspects, the step of receiving the one or more selection events includes receiving the one or more selection events from one or more of: conductive gloves, wand controllers, any of an augmented reality peripheral and controller, any of a virtual reality peripheral and controller, a camera, and a machine vision peripheral.

In still further related aspects, the step of identifying the source graphical shape and the target graphical shape includes identifying the source graphical shape and a plurality of target graphical shapes based on receiving a plurality of selection events, the source graphical shape being identified based on a first selection event, and the plurality of target graphical shapes being identified based on a plurality of subsequent selection events; and the step of generating and displaying the connector includes generating and displaying a plurality of connectors between the source graphical shape and the plurality of target graphical shapes based on determining a source connection point, a target connection point, and a length for each connector among the plurality of connectors.

In other related aspects, the invention further includes responding to receiving a subsequent selection event by determining whether a said connector exists between the source graphical shape and the target graphical shape; and, upon determining that a said connector exists, generating and displaying an inverted connector between the source graphical shape and the target graphical shape that replaces the connector.

In yet other related aspects, the subsequent selection event includes any of: a single tap of the connector, a double tap of the connector, a multi-touch single tap on the source graphical shape and the target graphical shape, a multi-touch double tap on the source graphical shape and the target graphical shape, and a long press on the source graphical shape followed by any of a single tap and a double tap of the target graphical shape.

In related aspects, the step of identifying the source graphical shape and the target graphical shape based on one or more of: a relative position of the source graphical shape and the target graphical shape, a relative time that the source graphical shape was added compared to the target graphical shape, a color of any of the source graphical shape and the target graphical shape, and a size of any of the source graphical shape and the target graphical shape The foregoing and other aspects of the invention are evident in the text that follows and in the drawings.

BRIEF DESCRIPTION OF THE DRAWINGS

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the invention, the scope of which is set forth in the detailed description that follows.

DETAILED DESCRIPTION OF EXAMPLE EMBODIMENTS

Figure 1:
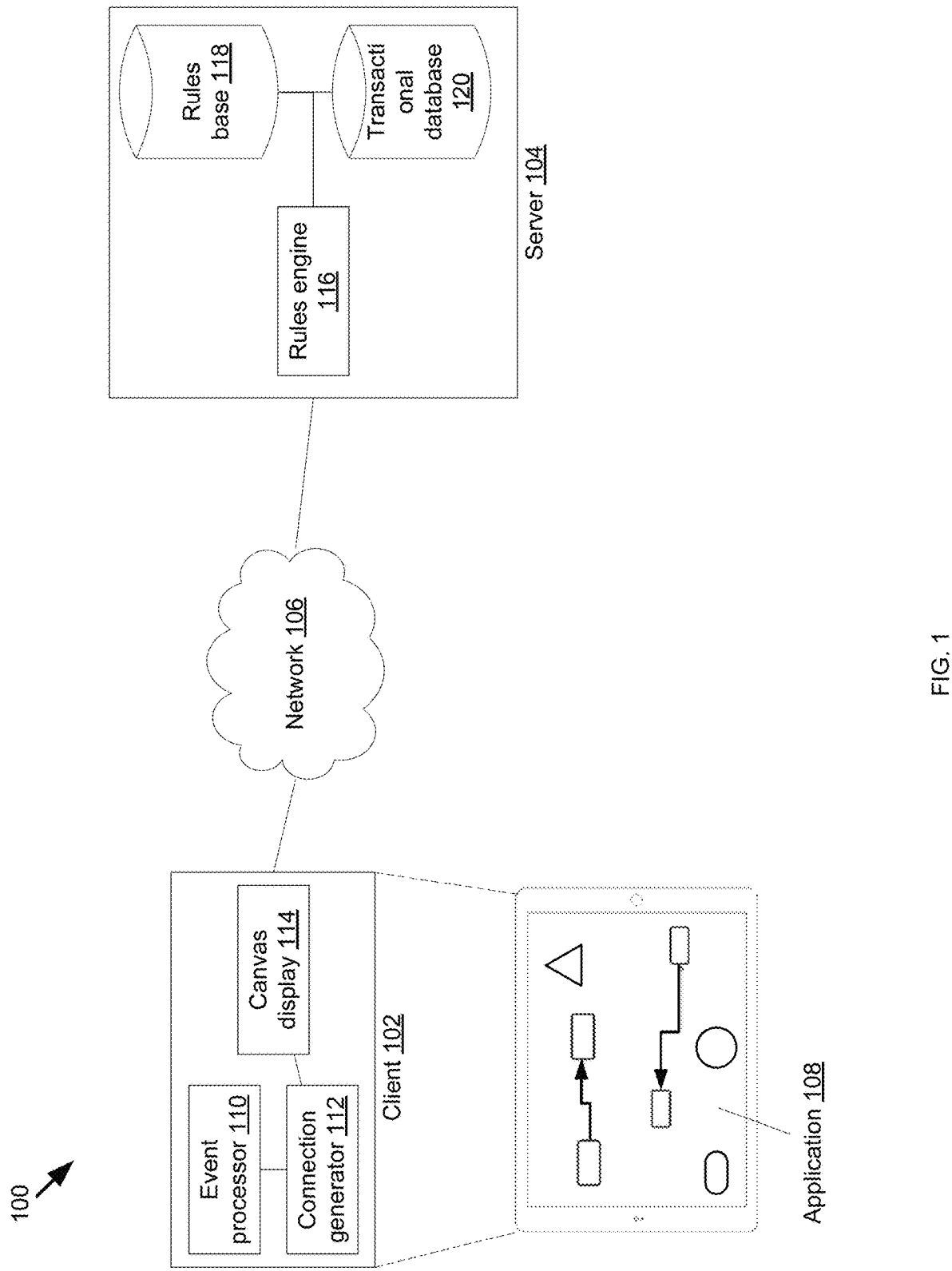
FIG. 1 illustrates an example shape connection system, in accordance with some embodiments of the present invention.

The systems, apparatus, methods, and computer-readable media described herein allow for rapid generation of connections between graphical shapes. In some embodiments, the shape connection engine described herein can be used in any application that displays graphical shapes. Non-limiting example applications include a business application displaying a workflow canvas, a visual model editor, visual code editor, a presentation or slide program, or other diagramming program. (The shape connection system and related apparatus, methods, and computer-readable medium as discussed here and elsewhere herein are sometimes referred to herein as the "shape connection engine.")

The shape connection system and methods involve generating a connector between two graphical shapes based on receiving and processing one or more selection events on a client apparatus. In some embodiments, a selection event corresponds to receiving a single tap on a graphical shape displayed by a client mobile device such as a tablet or phone. Thus, in response to receiving sequential selection events that correspond to single taps sequentially on a source shape followed by a target shape, the shape connection engine generates and displays a graphical connector between the source shape and the target shape. In further embodiments, the selection event can correspond to receiving a tap held for several microseconds, milliseconds, or seconds on the client mobile device to identify the source shape (sometimes referred to herein as a "long press" or "long tap"). In still further aspects, the client mobile device can change visual aspects of the source shape upon receiving the selection event, such as graphically enlarging the size of the source shape or changing the color of the source shape so as to simulate that the source shape is elevated or selected. In response to receiving multiple selection events sequentially while a long press is held, additional embodiments of the shape connection engine can generate multiple connectors from the source shape to multiple target shapes corresponding to the multiple selection events.

In other embodiments, a selection event contains two selection points that correspond to receiving a single tap and tracking two fingers that are touched substantially simultaneously on two graphical shapes displayed by the client mobile device (sometimes referred to herein as "multi-touch"). In response to receiving a selection event tracking multi-touch, the shape connection engine identifies the source shape and target shape. Some embodiments of the shape connection engine can identify the source shape as the leftmost shape and the target shape as the rightmost shape on a graphical canvas. Other embodiments of the shape connection engine can identify the source shape as a first shape that was added earlier in time to the canvas, regardless of its relative position left or right. The target shape can be a second shape added later in time to the canvas, regardless of relative position. In still other embodiments, the shape connection engine can identify the source shape and target shape based on any shape property that allows the user to define an ordering criterion in the application. Non-limiting example properties include position (e.g., up, down, left, right), time that the shape was added to the canvas, color (e.g., green, red, or blue shapes), or size (e.g., small to large).

The shape connection engine determines a source connection point and target connection point based on the source shape and target shape. For example, the source connection point or target connection point can correspond to a geometrical center of the source shape or target shape, even if the user tapped a point inside the source shape or target shape that is offset from the geometrical center. Alternatively, the shape connection engine can determine the source connection point and target connection point so as to correspond to a point on a boundary of the source shape and a point on a boundary of the target shape that minimizes a distance and connector length between the source shape and target shape. The shape connection engine determines a length for the connector based on the source connection point and target connection point. In some embodiments, the connector type can be a straight connector, a right angle connector (e.g., having one or more right angles between the source connection point and target connection point) or a curved connector (e.g., having a curved path between the source connection point and target connection point instead of a straight line). Accordingly, some embodiments of the shape connection engine can determine the length further based on the connector type.

The shape connection engine generates and displays the connector between the source shape and target shape based at least on the source connection point, target connection point, and length. In some embodiments, the displayed connector can be a solid or dashed line between the source connection point and the target connection point. In further embodiments, the shape connection engine can display the connector using a thinner or thicker line based on a connection weight or thickness. In still further embodiments, the displayed connector can include an arrow at the beginning to indicate the source shape, an arrow at the end to indicate the target shape, or arrows at the beginning and end.

Some embodiments of the shape connection engine can invert existing connectors. The shape connection engine can receive a subsequent selection event. For example, the subsequent selection event can be a multi-touch event corresponding to a single tap tracking two input locations touched substantially simultaneously (e.g., single tapping with two fingers substantially simultaneously, one finger on an existing source shape and another finger on an existing target shape). Further embodiments of the subsequent selection event can correspond to a double tap of the two input locations touched twice substantially simultaneously (e.g., double tapping with two fingers substantially simultaneously on an existing source shape and target shape). Still further embodiments of the subsequent selection event can include receiving a user's long press on an existing source shape or target shape, followed sequentially by a single tap or double tap of an existing target shape or source shape. If the shape connection engine receives a subsequent selection event, the shape connection engine determines whether a connector already exists between the source shape and target shape. Upon an affirmative determination that a connector already exists, the shape connection engine sets the original source shape to be the new target shape and the original target shape to be the new source shape, and inverts the existing connector with the beginning connected to the new source shape and the end connected to the new target shape. In alternate embodiments, the shape connection engine removes the existing connector and generates and displays a new inverted connector with the beginning connected to the new source shape and the end connected to the new target shape. In further embodiments, if there are multiple connectors between the original source shape and original target shape, the shape connection engine selects a connector to invert based on a contextual criterion relevant to the context of the flow or diagram. Non-limiting example contextual criteria include the oldest or newest connector, the frontmost or back-most connector, the highest or lowest connector in the stack, the thickest or thinnest connector, or the darkest or lightest connector. Alternately, the shape connection engine can allow the user to select which connector to invert.

FIG. 1 illustrates example shape connection system 100 in accordance with some embodiments of the present invention. Shape connection system 100 includes client 102 and server 104, in communication over network 106.

Client 102 runs application 108. Application 108 is configured to display graphical shapes on a virtual canvas. Non-limiting examples of application 108 include a business application displaying a workflow canvas, a visual code editor, visual model editor, a presentation or slide program, or other diagramming program, all of the type known in the art as adapted in accord with the teachings herein. In this regard, application 108 can be implemented, for example, on one or more digital data processing systems in the conventional manner known in the art, again, as adapted in accord with the teachings herein.

Application 108 uses event processor 110, connection generator 112, and canvas display 114 to generate and display connectors among graphical shapes. Event processor 110 receives one or more selection events. In some embodiments, the selection events can represent a single multi-touch event (e.g., single tapping two or more graphical shapes using two or more fingers). In other embodiments, the shape connection engine can receive multiple selection events that represent a sequence or series of multi-touch events (e.g., double tapping two or more graphical shapes using two or more fingers). In still other embodiments, the shape connection engine can receive selection events from a sensor array that does not depend on touch input to determine input locations or selection points. By way of non-limiting example, the shape connection engine can receive input from a stylus, digital pen or pencil, conductive gloves, wand controllers, augmented or virtual reality peripherals or controllers, photo camera, video camera, or other machine vision peripherals, or other sensor arrays configured to detect a user's finger or pointer position in a two dimensional plane or three dimensional space (e.g., sensor detection in front of or behind a display) to allow a user to manipulate a graphical shape or other object directly or virtually. A non-limiting example augmented or virtual reality peripheral includes the HoloLens augmented reality environment from Microsoft Corporation in Redmond, Wash., United States. A non-limiting example camera peripheral includes the Kinect camera peripheral also from Microsoft Corporation. Connection generator 112 generates a connector between a source shape and a target shape based at least on the received selection events. Canvas display 114 displays the generated connector in application 108.

Some embodiments of client 102 include one or more client digital data processors. The client digital data processors can be of the type commercially available in the marketplace suitable for operation in shape connection system 100 and adapted in accord with the teachings herein, for example, in communication with applications executing in one or more rules engines, e.g. as discussed elsewhere herein. Client 102 may be implemented in mobile computers executing on mobile phones, tablet computers, personal digital assistants (PDAs), desktop computers, laptop computers, workstations, or other suitable apparatus adapted based on the systems and methods described herein. The client digital data processor includes central processing, memory, storage using a non-transitory computer-readable medium (e.g., a magnetic disk, solid state drive, or other storage medium), and input/output units and other constituent components (not shown) of the type conventional in the art that are programmed or otherwise configured in accord with the teachings herein.

In some embodiments, client 102 and application 108 communicate with server 104 over network 106. However, server 104 and network 106 are optional for shape connection system 100, which can be configured using the client digital data processor and application 108 on client 102. Additionally, some embodiments of application 108 and client 102 can run in an offline mode, disconnected from network 106 and server 104.

In some embodiments, server 104 includes one or more server digital data processors, The server digital data processors can be digital processors of the type commercially available in the marketplace suitable for operation in shape connection system 100 and adapted in accord with the teachings herein, for example, utilizing models and rules that form enterprise applications executing in one or more rules engines, e.g. as discussed elsewhere herein. Though server 104 can be typically implemented in server-class computers such as a minicomputer, server 104 may also be implemented in desktop computers, workstations, laptop computers, tablet computers, personal digital assistants (PDAs), mobile computers, or other suitable apparatus adapted based on the systems and methods described herein. The server digital data processor includes central processing, memory, storage using a non-transitory computer-readable medium (e.g., a magnetic disk, solid state drive, or other storage medium), and input/output units and other constituent components (not shown) of the type conventional in the art that are programmed or otherwise configured in accord with the teachings herein.

In some embodiments, an enterprise can deploy shape connection system 100 in support of enterprise applications executing on server 104 remote to application 108 on client 102. Such enterprise applications can include specialized software or hardware used within a specific industry or business function (e.g., human resources, finance, healthcare, telecommunications, insurance, etc.). Alternatively, the enterprise applications can include cross-industry applications (e.g., project management), or other types of software or hardware applications.

In some embodiments, rules define the enterprise applications. Server 104 can be in communication with rules engine 116. Rules engine 116 can be in communication with rules base 118 and transactional database 120. As the enterprise application executes on a server digital data processor (e.g., server 104), shape connection system 100 may retrieve any portion of the rules that define the enterprise application from rules base 118 and process or execute the rules in response to requests or events signaled to or detected by the server digital data processors or client digital data processors at run-time, (e.g., using rules engine 116).

Rules base 118 can include a rules base of the type known in the art (albeit configured in accord with the teachings herein) for storing rules (e.g., scripts, logic, controls, instructions, metadata, etc.) and other application-related information in tables, database records, database objects, and so forth. Preferred rules and rules bases can be of the type described in U.S. Pat. No. 5,826,250, entitled "Rules Bases and Methods of Access Therein" and U.S. Pat. No. 7,640,222, entitled "Rules Base Systems and Methods with Circumstance Translation," the entire contents of both of which are incorporated by reference herein in their entirety. In other embodiments, rules and rules bases that are architected or operated differently may be used as well.

Some embodiments of shape connection system 100 may utilize multiple rules bases. For example, rules base 118 may be an enterprise-wide rules base in communication with rules engine 116, and domain-specific rules bases may be accessible to server 104 or application 108 on client 102 via network 106. If multiple rules bases are provided in a given embodiment, the rules bases may be of like architecture and operation or may differ in architecture and operation as well.

In some embodiments, rules comprise meta-information structures. For example, the rules can include data elements or method elements. The method elements can be procedural or declarative. For example, method elements in a rule may be procedural insofar as the rule comprises one or more of a series of ordered steps. Declarative elements in a rule may set forth (i.e., declare) a relation between variables or values (e.g., a loan rate calculation or a decision-making criterion). Alternatively, declarative elements may declare a desired computation or result without specifying how the computations should be performed or how the result should be achieved. In one non-limiting example, a declarative portion of a rule may declare a desired result of retrieving a specified value without specifying a data source for the value or a particular query language for such retrieval (e.g., SQL, CQL, .QL, etc.). In other cases, the declarative portion of a meta-information structure may comprise declarative programming language statements (e.g., SQL). Still other types of declarative meta-information structures are possible.

While some rules may comprise meta-information structures that are wholly procedural and other rules may comprise meta-information structures that are wholly declarative, shape connection system 100 can also include rules that comprise both procedural and declarative meta-information structures. That is, such rules can have meta-information structure portions that are declarative, as well as meta-information structure portions that are procedural. Furthermore, rules of the illustrated embodiments that comprise meta-information structures may also reference or incorporate other rules. Those other rules may themselves in turn reference or incorporate still other rules. As a result, editing such a rule may affect one or more rules that incorporate it (if any).

An advantage of rules that comprise meta-information structures over conventional rules is that meta-information structures provide administrators with flexibility to apply code-based or model-driven techniques in development and modification of applications or computing platforms. Particularly, like models in a model-driven environment, meta-information structures comprise data elements that can be used to define aspects of a complex system at a higher level of abstraction than source code written in programming languages such as Java or C++. On the other hand, administrators may also embed programming language statements into meta-information structures if the administrators deem that to be the most efficient design for the system being developed or modified. At run-time, rules engine 116 can convert the data elements of the meta-information structures along with programming language statements (if any) automatically into executable code for the application.

Thus, in some embodiments rules may be the primary artifacts that get created, stored (e.g., in rules base 118) or otherwise manipulated to define or modify the overall functionality of rules-based enterprise applications. The enterprise applications may automate or manage various types of work in different business domains at run-time. By way of non-limiting example, rules stored in rules base 118 may be configured to define aspects of an enterprise application. For example, rules can define the user interface, decision logic, integration framework, process definition, data model, reports, or security settings of a given enterprise application.

Transactional database 120 can include databases of the type known in the art (albeit configured in accord with the teachings herein) for storing corporate, personal, governmental, or other data. Rules such as in rules base 118 may generate, update, transform, delete, store, or retrieve the data (herein collectively referred to as "processing" the data). Example data may include financial data; customer records; personal data; design-time, development-time, or runtime data related to an application; or other types of data. Transactional database 120 may store the data in tables, database records, or database objects, for example.

Transactional database 120 may be present in any given embodiment. Conversely, some embodiments may use multiple transactional databases, e.g., an enterprise-wide database accessible to server 104 and branch-office specific databases accessible to client 102, by way of non-limiting example. If multiple transactional databases are provided in a given embodiment, the transactional databases may be of like architecture and operation; though, they may have differing architecture or operation, as well.

Rules engine 116 can be of the type conventionally known in the art (albeit configured in accord with the teachings herein) for use in processing or executing rules from rules base 118 to process data in (or for storage to) transactional database 120, e.g. in connection with events signaled to or detected by rules engine 116. Preferred such rules engines are of the type described in U.S. Pat. No. 5,826,250, entitled "Rules Bases and Methods of Access Therein," U.S. Pat. No. 7,640,222, entitled "Rules Base Systems and Methods with Circumstance Translation," and U.S. Pat. No. 8,250,525, entitled "Proactive Performance Management For Multi-User Enterprise Software Systems," all of which are incorporated by reference in their entirety herein. Rules engine 116 may be implemented in a single software program, multiple software programs or modules, or a combination of software modules or programs. Rules engine 116 may comprise programming instructions, scripts, or rules (e.g., rules stored in rules base 118) or a combination therein.

Some embodiments of rules engine 116 may execute on or over multiple digital data processors. For example, shape connection system 100 may invoke rules engine 116 for execution on a single digital data processor (e.g., a digital data processor on server 104 or client 102). Subsequently, shape connection system 100 may apportion, distribute, or execute portions of rules engine 116 (or, potentially, the entirety of rules engine 116) over multiple digital data processors.

Other ways of implementing or executing rules engine 116 are also possible. By way of non-limiting example, rules engine 116 may have additional distinct components or portions that can be apportioned and distributed separately. Non-limiting example components include a data access component for processing data during rule execution, a session management component for keeping track of activity across sessions of interaction with a digital data processor, or a performance monitoring component for monitoring and interacting with various system resources or event logs to manage performance thresholds.

Network 106 can include one or more networks of the type commercially available in the marketplace or otherwise suitable for supporting communication between client 102 and server 104 in accord with the teachings herein. Network 106 can be wired or wireless, a cellular network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), or a network operating in accordance with existing IEEE 802.11, 802.11a, 802.11b, 802.11g, 802.11n, 802.16, 802.16d, 802.16e, 802.16m standards or future versions or derivatives of the above standards.

Figure 2:
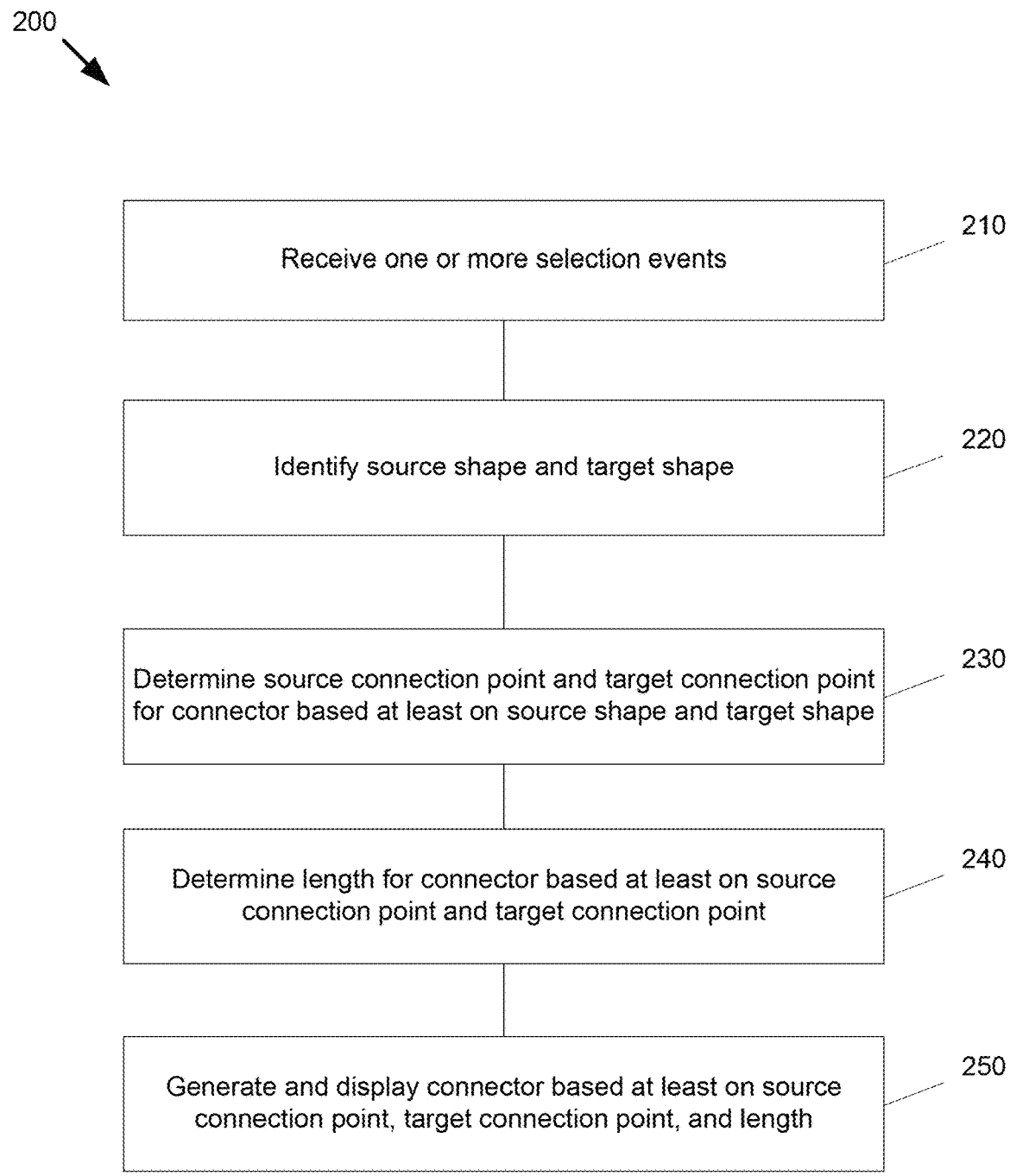
FIG. 2 illustrates an example method for connecting shapes, in accordance with some embodiments of the present invention.

FIG. 2 illustrates an example method 200 for connecting shapes, in accordance with some embodiments of the present invention. The client digital data processor receives one or more selection events (step 210). The selection events can track input locations on a sensor array. By way of non-limiting example, the sensor array can be part of a touch-sensitive display used on a mobile phone or tablet. The input locations can be coordinates on the touch-sensitive display where the user taps or presses on a source shape or target shape. Some embodiments of the selection events can track a single input location (e.g., a location corresponding to a single tap on a graphical shape). Other embodiments of the selection events can use a single selection event to track "multi-touch" with multiple input locations (e.g., multiple locations corresponding to a single tap with multiple fingers on multiple graphical shapes).

The shape connection engine identifies a source shape and a target shape based on the received selection events (step 220). For example, the shape connection engine determines the input locations from the selection events. These input locations are sometimes referred to herein as "selection points." The shape connection engine can use boundary metadata for shapes to determine that a first input location or selection point is bounded within a first graphical shape, and a second input location or selection point is bounded within a second graphical shape. The shape connection engine proceeds to identify one graphical shape as the source shape, and the other graphical shape as the target shape. Some embodiments of the shape connection engine can identify the source shape as the leftmost shape and the target shape as the rightmost shape on the graphical canvas. Other embodiments of the shape connection engine can identify the source shape as a first shape that was added earlier in time to the canvas, regardless of its relative position left or right. The target shape can be a second shape added later in time to the canvas, regardless of relative position. In still other embodiments, the shape connection engine can identify the source shape and target shape based on any shape property that allows the user to define an ordering in the application. Non-limiting example properties include position (e.g., up, down, left, right), time that the shape was added to the canvas, color (e.g., green, red, or blue shapes), or size (e.g., small to large).

The shape connection engine determines a source connection point and a target connection point based on the identified source shape and target shape (step 230). For example, the source connection point or target connection point can correspond to a geometrical center of the source shape or target shape, even if the user tapped a point inside the source shape or target shape that is offset from the geometrical center. Alternatively, the shape connection engine can determine the source connection point and target connection point so as to correspond to a point on a boundary of the source shape and a point on a boundary of the target shape that minimizes a distance and connector length between the source shape and target shape.

The shape connection engine further determines a length for the connector based on the source connection point and target connection point (step 240). For example, if the connector type is a straight connector, the shape connection engine determines $(x_s, y_s)$ coordinates for the source connection point and $(x_t, y_t)$ coordinates for the target connection point. The shape connection engine determines the connector length according to $\sqrt{|x_t-x_s|^2+|y_t-y_s|^2}$. In some embodiments, the connector type can be a right angle connector (e.g., having one or more right angles between the source connection point and target connection point) or a curved connector (e.g., having a curved path between the source connection point and target connection point instead of a straight line). Accordingly, some embodiments of the shape connection engine can determine the length further based on the connector type.

The shape connection engine generates and displays the connector between the source shape and target shape based at least on the source connection point, target connection point, and length (step 250). In some embodiments, the displayed connector can be a solid or dashed line between the source connection point and the target connection point. In further embodiments, the shape connection engine can display the connector using a thinner or thicker line based on a connection weight or thickness. In still further embodiments, the displayed connector can include an arrow at the beginning to indicate the source shape, an arrow at the end to indicate the target shape, or arrows at the beginning and end.

Figure 3:
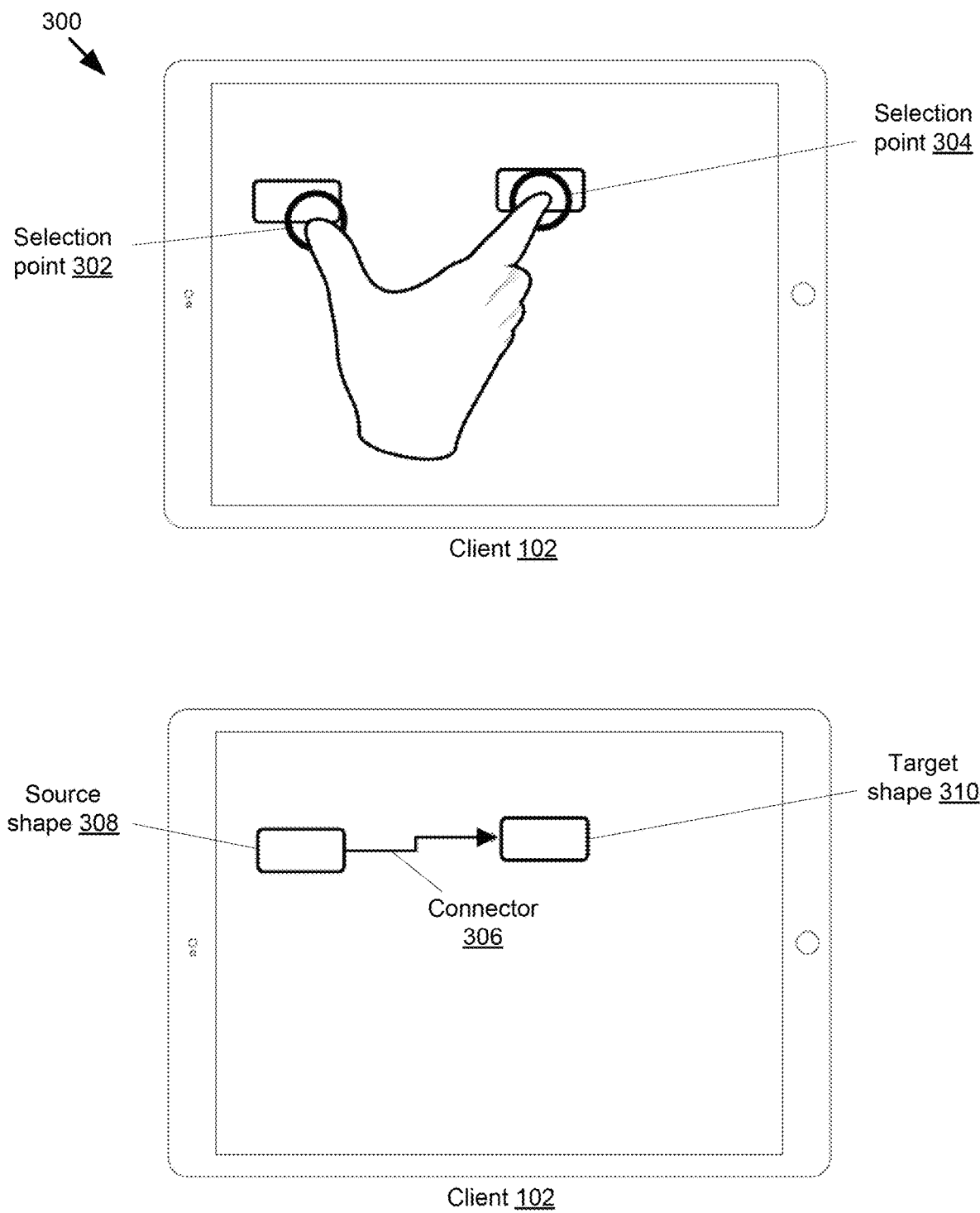
FIG. 3 illustrates an example interaction in which the shape connection engine processes a single selection event, in accordance with some embodiments of the present invention.

FIG. 3 illustrates an example interaction 300 in which the shape connection engine processes a single selection event, in accordance with some embodiments of the present invention. Client 102 receives a selection event tracking selection points 302, 304, and uses the shape connection engine to generate connector 306 in response to the received selection event.

Client 102 receives a selection event, for example from a touch-sensitive display in communicative coupling with the client digital data processor. In some embodiments the received selection event is a single event that tracks multiple selection points such as selection points 302, 304. Selection points 302, 304 can correspond to a user tapping multiple graphical shapes substantially simultaneously. The shape connection engine identifies selection points 302, 304 from the selection event. In further embodiments, the shape connection engine can receive multiple selection events within a short timeframe such as a few microseconds, milliseconds, or seconds, and process selection points 302, 304 from the multiple selection events as if the selection points were received substantially simultaneously.

The shape connection engine identifies a source shape and a target shape corresponding to selection points 302, 304. First, the shape connection engine identifies graphical shapes corresponding to selection points 302, 304. For example, the shape connection engine uses shape boundary metadata to determine that selection point 302 is bounded within a first rectangle shape, and selection point 304 is bounded within a second rectangle shape. Next, the shape connection engine identifies one shape as the source shape and the other shape as the target shape. For example, some embodiments of the shape connection engine can identify source shape 308 as the leftmost shape and target shape 310 as the rightmost shape on the graphical canvas. Other embodiments of the shape connection engine can identify the source shape as a first shape that was added earlier in time to the canvas, regardless of its relative position left or right. The target shape can be a second shape added later in time to the canvas, regardless of relative position. In still other embodiments, the shape connection engine can identify the source shape and target shape based on any shape property that allows the user to define an ordering in the application. Non-limiting example properties include position (e.g., up, down, left, right), time that the shape was added to the canvas, color (e.g., green, red, or blue shapes), or size (e.g., small to large).

The shape connection engine determines a source connection point and a target connection point based on the source shape and target shape. For example, the source connection point or target connection point can correspond to a geometrical center of the source shape or target shape, even if the user tapped a point inside the source shape or target shape that is offset from the geometrical center. Alternatively, the shape connection engine can determine the source connection point and target connection point so as to correspond to a point on a boundary of the source shape and a point on a boundary of the target shape that minimizes a distance and connector length between the source shape and target shape. The shape connection engine further determines a length for the connector based on the source connection point and target connection point. In some embodiments, the connector type can be a straight connector, a right angle connector such as connector 306 (e.g., having one or more right angles between the source connection point and target connection point) or a curved connector (e.g., having a curved path between the source connection point and target connection point instead of a straight line). Accordingly, some embodiments of the shape connection engine can determine the length further based on the connector type. The shape connection engine generates and displays the connector, such as connector 306, between the source shape and target shape based at least on the source connection point, target connection point, and length.

Figure 4:
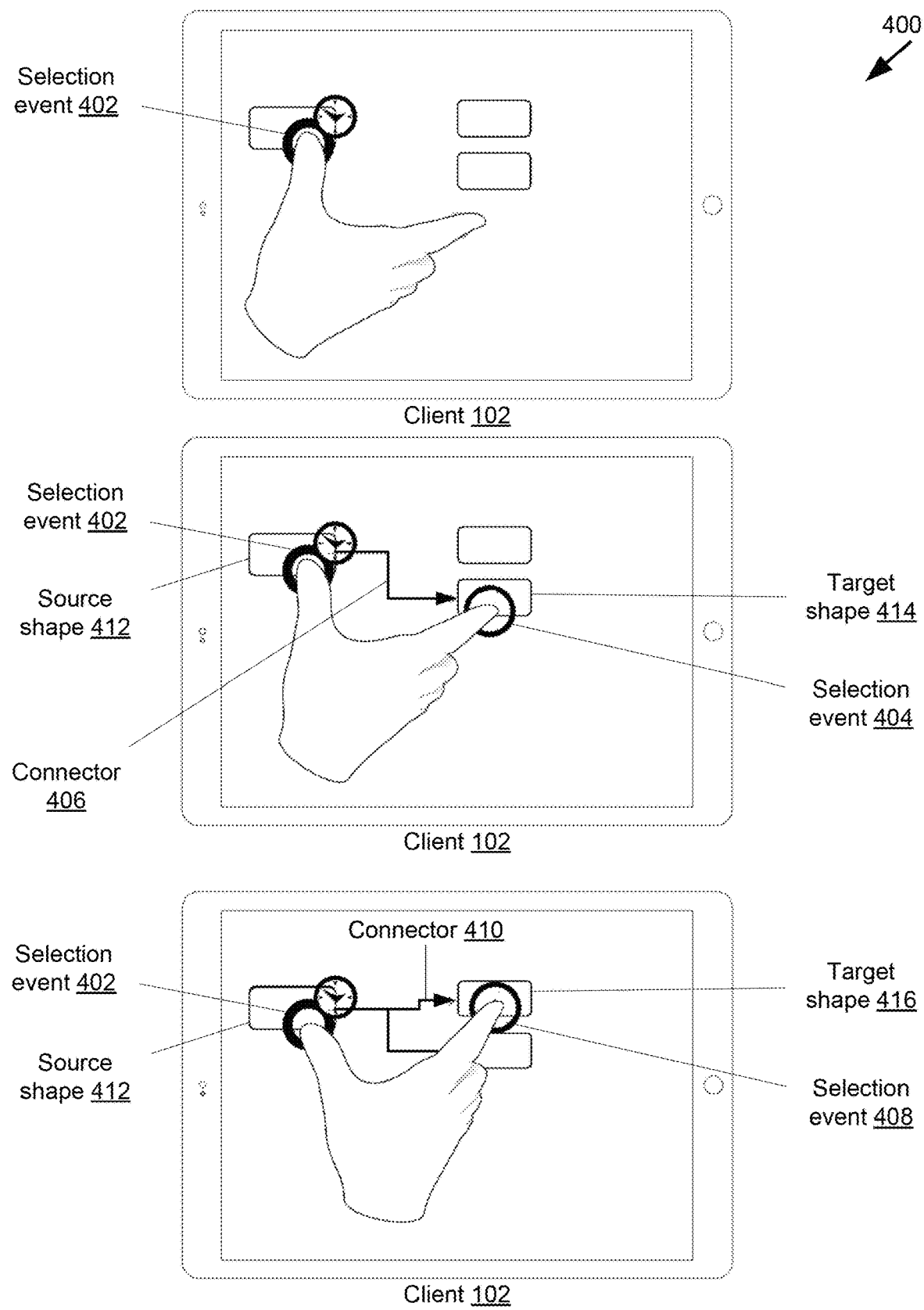
FIG. 4 illustrates an example interaction in which the shape connection engine processes multiple selection events, in accordance with some embodiments of the present invention.

FIG. 4 illustrates an example interaction 400 in which the shape connection engine processes multiple selection events, in accordance with some embodiments of the present invention. First, client 102 receives selection events 402, 404, and uses the shape connection engine to generate connector 406 in response to the received selection events. Next, client 102 receives selection event 408 while the user is still touching source shape 412 corresponding to selection event 402, and uses the shape connection engine to generate connector 410 in response to the received selection events.

Client 102 receives first selection event 402, for example from a touch-sensitive display in communicative coupling with the client digital data processor. In some embodiments, first selection event 402 can include metadata that indicates the user is holding a finger in substantially the same position for several microseconds, milliseconds, or seconds (e.g., a "long press" or "long tap"). FIG. 4 illustrates this long press with a clock over first selection event 402. Some embodiments of the shape connection engine can graphically enlarge the size of source shape 412 upon receiving first selection event 402, so as to simulate that source shape 412 is elevated or selected. In other embodiments, first selection event 402 can correspond to a single tap to select source shape 412, without a long press. The shape connection engine identifies a source selection point from selection event 402. The shape connection engine identifies source shape 412 corresponding to the source selection point. For example, the shape connection engine uses shape boundary metadata to determine that the source selection point is bounded within a first rectangle shape.

Client 102 receives second selection event 404, for example from the touch-sensitive display. In some embodiments, the shape connection engine identifies a target selection point from second selection event 404. Accordingly, the shape connection engine allows the user to tap the first shape to identify source shape 412, and sequentially tap the second shape to identify target shape 414. In other embodiments, the shape connection engine first determines whether first selection event 402 indicates that the user's finger is still held down, or "long pressing," on the source selection point corresponding to source shape 412. Upon an affirmative determination that the user is still long pressing the source selection point, the shape connection engine identifies the target selection point from second selection event 404. Upon a negative determination that the user's finger is no longer long pressing the source selection point, the shape connection engine does not identify a target selection point, and does not generate or display a graphical connector to connect source shape 412 to target shape 414. Accordingly, the shape connection engine requires the user to long press the first shape to identify source shape 412, and subsequently tap the second shape to identify target shape 414.

After identifying a target selection point from second selection event 404, the shape connection engine identifies target shape 414 corresponding to the target selection point. For example, the shape connection engine uses shape boundary metadata to determine that the target selection point is bounded within a second rectangle shape. Because second selection event 404 follows first selection event 402 in time, the shape connection engine determines that first selection event 402 corresponds to source shape 412 and second selection event 404 corresponds to target shape 414.

The shape connection engine determines a source connection point and a target connection point based on source shape 412 and target shape 414. For example, the source connection point or target connection point can correspond to a geometrical center of source shape 412 or target shape 414, even if the user tapped a point inside source shape 412 or target shape 414 that is offset from the geometrical center. Alternatively, the shape connection engine can determine the source connection point and target connection point so as to correspond to a point on a boundary of source shape 412 and a point on a boundary of target shape 414 that minimizes a distance and connector length between source shape 412 and target shape 414. The shape connection engine further determines a length for connector 406 based on the source connection point and target connection point. In some embodiments, the connector type can be a straight connector, a right angle connector such as connector 406 (e.g., having one or more right angles between the source connection point and target connection point) or a curved connector (e.g., having a curved path between the source connection point and target connection point instead of a straight line). Accordingly, some embodiments of the shape connection engine can determine the length further based on the connector type. The shape connection engine generates and displays the connector, such as connector 406, between source shape 412 and target shape 414 based at least on the source connection point, target connection point, and length.

Client 102 subsequently receives third selection event 408. In some embodiments, the shape connection engine determines whether first selection event 402 indicates that the user's finger is still long pressing the source selection point corresponding to source shape 412. Upon an affirmative determination that the user's finger is still long pressing the source selection point, the shape connection engine identifies a subsequent target selection point from third selection event 408. After identifying the subsequent target selection point from third selection event 408, the shape connection engine identifies subsequent target shape 416 corresponding to the subsequent target selection point. For example, the shape connection engine uses shape boundary metadata to determine that the subsequent target selection point is bounded within a third rectangle shape. The shape connection engine determines a subsequent target connection point based on subsequent target shape 416, for example, a point on a boundary of subsequent target shape 416 that minimizes a distance and connector length between source shape 412 and subsequent target shape 416. The shape connection engine further determines a length for connector 410 based on the source connection point and subsequent target connection point. In this manner, the shape connection engine provides rapid generation of multiple connectors to connect multiple target shapes 414, 416 from long pressing a single source shape 412.

Figure 5:
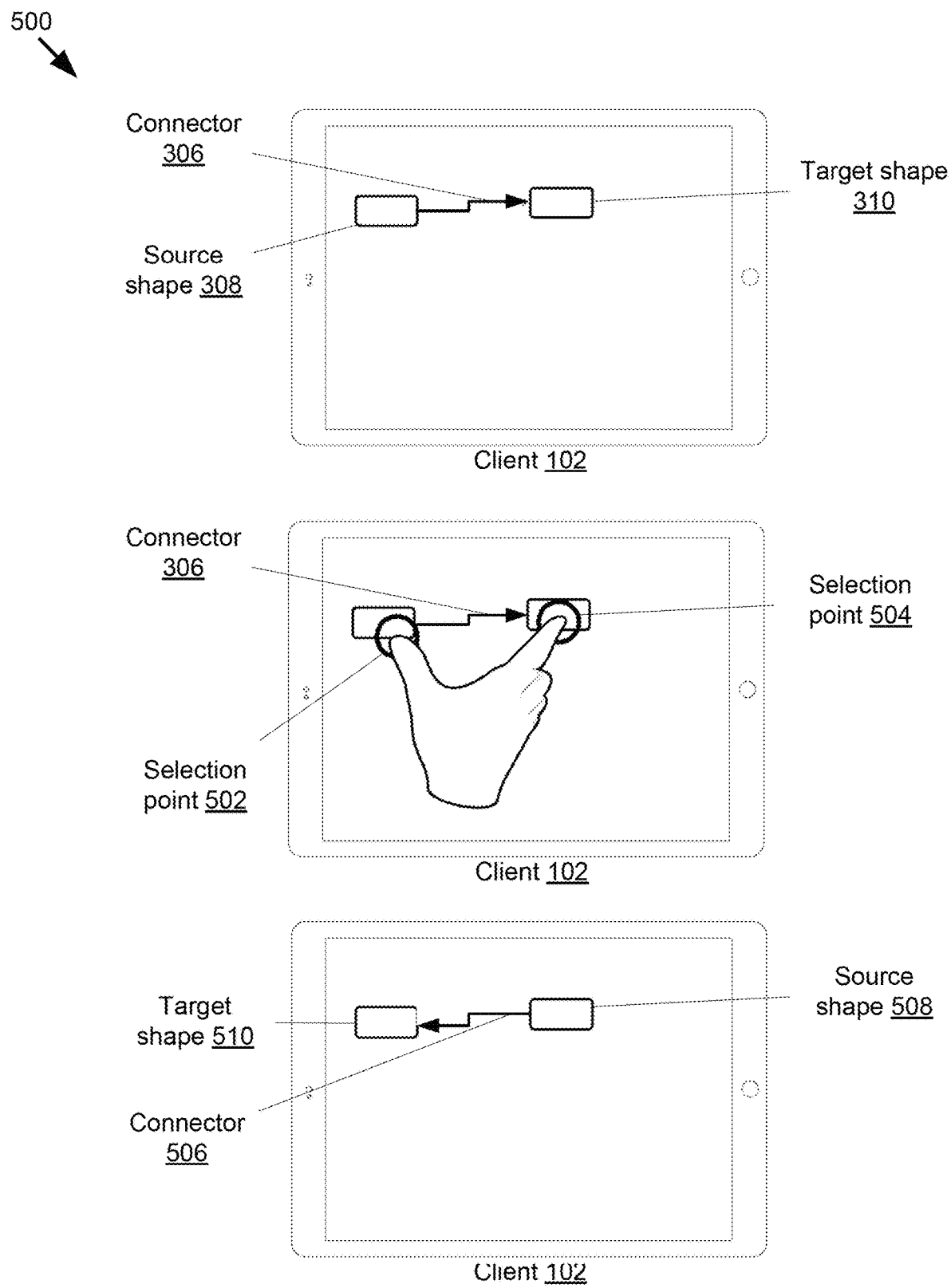
FIGS. 5-6 illustrate example interactions in which the shape connection engine processes a subsequent selection event to invert a graphical connector, in accordance with some embodiments of the present invention.

FIG. 5 illustrates an example interaction 500 in which the shape connection engine processes a subsequent selection event to invert a connector, in accordance with some embodiments of the present invention. Client 102 initially uses the shape connection engine to generate and display connector 306 in accordance with the interaction described earlier in connection with FIG. 3. Next, client 102 receives a subsequent selection event.

In some embodiments, the shape connection engine verifies whether the subsequent selection event indicates the user has performed a second single tap using two fingers, thereby identifying selection points 502, 504. In other embodiments, the shape connection engine verifies whether the subsequent selection event indicates the user has performed a double tap using two fingers, so as to identify selection points 502, 504. In alternate embodiments, the shape connection engine verifies whether the subsequent selection event indicates the user has performed a single tap or double tap substantially near connector 306. If the user has tapped two shapes rather than an existing connector, the shape connection engine determines whether a connector already exists between the shapes identified by selection points 502, 504. For example, FIG. 5 illustrates that connector 306 already exists between source shape 308 and target shape 310.

Upon an affirmative determination that connector 306 already exists, the shape connection engine sets original source shape 308 to be new target shape 510 and original target shape 310 to be new source shape 508, and inverts connector 306 to create connector 506 beginning at new source shape 508 and ending at new target shape 510. In alternate embodiments, the shape connection engine removes existing connector 306 and generates and displays connector 506 as a new inverted connector with the beginning connected to new source shape 508 and the end connected to new target shape 510. In further embodiments, if there are multiple connectors between the original source shape and original target shape, the shape connection engine selects a connector to invert based on any property relevant to the context of the flow or diagram (e.g., oldest or newest connector, front-most or back-most connector, highest or lowest connector in stack, thickest or thinnest connector, darkest or lightest connector). Alternately, the shape connection engine can allow the user to select which connector to invert.

Figure 6:
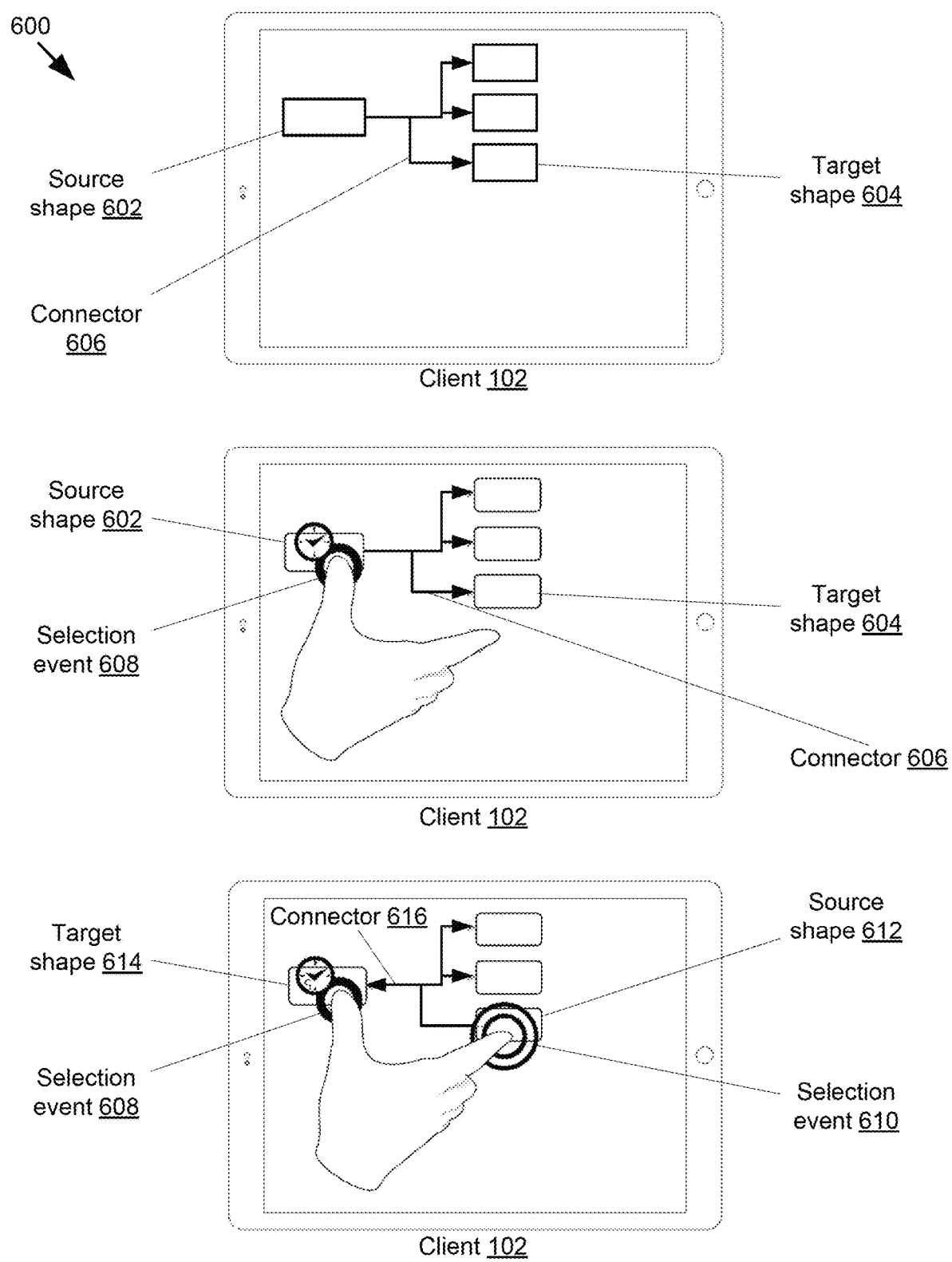

FIG. 6 illustrates an example interaction 600 in which the shape connection engine processes a subsequent selection event to invert a connector, in accordance with some embodiments of the present invention. Client 102 initially uses the shape connection engine to generate and display connector 606 between source shape 602 and target shape 604, in accordance with the interaction described earlier in connection with FIG. 4. Next, client 102 receives subsequent selection event 608.

In some embodiments, the shape connection engine verifies whether subsequent selection event 608 indicates the user has performed a long press, thereby identifying source shape 602. Next, client 102 receives a further selection event 610. In some embodiments, further selection event 610 can be a single tap or a double tap on new source shape 612. In further embodiments, the order of selection does not matter between original source shape 602 and original target shape 604. That is, in some embodiments the shape connection engine may allow the user to select original source shape 602 first and original target shape 604 second, or select original target shape 604 first and original source shape 602 second. Although FIG. 6 illustrates the result of selecting original source shape 602 first and original target shape 604 second, in some embodiments the same result would occur if the user selected original target shape 604 first (e.g., via long press) and original source shape 602 second (e.g., via single tap or double tap). The shape connection engine determines whether a connector already exists between the shapes identified by selection events 608, 610. For example, FIG. 6 illustrates that connector 606 already exists between original source shape 602 and original target shape 604.

Upon an affirmative determination that connector 606 already exists, the shape connection engine sets original source shape 602 to be new target shape 614 and original target shape 604 to be new source shape 612, and inverts existing connector 606 to generate connector 616 with the beginning connected to new source shape 612 and the end connected to new target shape 614. In alternate embodiments, the shape connection engine removes existing connector 606 and generates and displays connector 616 as a new inverted connector with the beginning connected to new source shape 612 and the end connected to new target shape 614. In further embodiments, if there are multiple connectors between original source shape 602 and original target shape 604, the shape connection engine selects a connector to invert based on any property relevant to the context of the flow or diagram (e.g., oldest or newest connector, front-most or back-most connector, highest or lowest connector in stack, thickest or thinnest connector, darkest or lightest connector). Alternately, the shape connection engine can allow the user to select which connector to invert.

Other embodiments are within the scope and spirit of the shape connecting systems and methods. For example, the shape connecting functionality described above can be implemented using software, hardware, firmware, hardwiring, or combinations of any of these. One or more digital data processors operating in accordance with instructions may implement the functions associated with shape connecting in accordance with the present disclosure as described above. If such is the case, it is within the scope of the shape connecting systems and methods that such instructions may be stored on one or more non-transitory computer-readable storage media (e.g., a magnetic disk, solid state drive, or other storage medium). Additionally, as described earlier, modules implementing functions may also be physically located at various positions, including being distributed such that portions of functions are implemented at different physical locations.

The shape connecting systems and methods are not to be limited in scope by the specific embodiments described herein. Indeed, other various embodiments of and modifications to the shape connecting, in addition to those described herein, will be apparent to those of ordinary skill in the art from the foregoing description and accompanying drawings. Thus, such other embodiments and modifications are intended to fall within the scope of the shape connecting systems and methods described herein. Furthermore, although the shape connecting has been described herein in the context of a particular implementation in a particular environment for a particular purpose, those of ordinary skill in the art will recognize that its usefulness is not limited thereto and that the shape connecting may be beneficially implemented in any number of environments for any number of purposes.

We claim:

1. A client apparatus for connecting graphical shapes, the apparatus comprising:
  a display configured to present a source graphical shape and a plurality of target graphical shapes,
  a client digital data processor in communicative coupling with the display, wherein the client digital data processor is configured to:
    identify the source graphical shape and the plurality of target graphical shapes based at least on a plurality of selection events determined by tracking input locations on a sensor array that is coupled to the client digital data processor, wherein the plurality of selection events comprises a multi-touch event comprising substantially simultaneous touching of a plurality of the input locations and includes (i) a first selection event in which a user holds a first finger on the sensor array in substantially a same position for a period constituting any of a long press or a long tap to identify the source graphical shape, (ii) a second selection event in which the user, simultaneous with the first selection event, touches a finger other than the first finger on the sensor array with a tap to identify a first said target graphical shape, and (iii) a third selection event successive to the second selection event in which the user, simultaneous with the first selection event, touches a finger other than the first finger on the sensor array with a tap to identify a second said target graphical shape;
    determine at least the source graphical shape based on the first selection event;
    determine at least the first target graphical shape based on the second selection event;
    determine at least the second target graphical shape based on the third selection event;
    determine a source connection point and a target connection point for a first connector between the source graphical shape and the first target graphical shape based at least on the source graphical shape and the first target graphical shape;
    determine a source connection point and a target connection point for a second connector between the source graphical shape and the second target graphical shape based at least on the source graphical shape and the second target graphical shape;
    determine a length for the first connector based at least on the source connection point and the target connection point of the first connector;
    determine a length for the second connector based at least on the source connection point and the target connection point of the second connector;
    generate and display, on the display, the first connector based at least on the source connection point, the target connection point, and the length of the first connector; and
    generate and display, on the display, the second connector based at least on the source connection point, the target connection point, and the length of the second connector.

2. The apparatus of claim 1, wherein the plurality of selection events is received from one or more of: conductive gloves, wand controllers, any of an augmented reality peripheral and controller, any of a virtual reality peripheral and controller, a camera, and a machine vision peripheral.

3. The apparatus of claim 1, wherein the client digital data processor is further configured to:
  responsive to receiving a selection event subsequent to the third selection event, determine whether a said connector exists between the source graphical shape and a selected one of said target graphical shapes; and
  upon a determination that a said connector exists, generate and display an inverted connector that replaces that connector between the source graphical shape and the selected target graphical shape.

4. The apparatus of claim 3, wherein the subsequent selection event includes any of: a single tap of the connector, a double tap of the connector, a multi-touch single tap on the source graphical shape and the selected target graphical shape, a multi-touch double tap on the source graphical shape and the selected target graphical shape, and a long press on the source graphical shape followed by any of a single tap and a double tap of the selected target graphical shape.

5. The apparatus of claim 1, wherein the client digital data processor is configured to identify the source graphical shape and one of the target graphical shapes based further on one or more of: a relative position of the source graphical shape and that target graphical shape, a relative time that the source graphical shape was added compared to that target graphical shape, a color of any of the source graphical shape and that target graphical shape, and a size of any of the source graphical shape and that target graphical shape.

6. A method for operating a client digital data processor to connect graphical shapes displayed thereby, the method comprising:
identifying a source graphical shape and a plurality of target graphical shapes based on a plurality of received selection events determined by tracking one or more input locations on a sensor array that is coupled to the client digital data processor, wherein the selection event is a multi-touch event indicating substantially simultaneous touching of a plurality of the input locations, wherein the plurality of selection events comprises a multi-touch event comprising substantially simultaneous touching of a plurality of the input locations and includes (i) a first selection event in which a user holds a first finger on the sensor array in substantially a same position for a period constituting any of a long press or a long tap to identify the source graphical shape, (ii) a second selection event in which the user, simultaneous with the first selection event, touches a finger other than the first finger on the sensor array with a tap to identify a first said target graphical shape, and (iii) a third selection event successive to the second selection event in which the user, simultaneous with the first selection event, touches a finger other than the first finger on the sensor array with a tap to identify a second said target graphical shape;
with the client digital data processor, determining at least the source graphical shape based on the first selection event;
with the client digital data processor, determining at least the first target graphical shape based on the second selection event;
with the client digital data processor, determining at least the second target graphical shape based on the third selection event;
with the client digital data processor, determining a source connection point and a target connection point for a first connector between the source graphical shape and the first target graphical shape based at least on the source graphical shape and the first target graphical shape;
with the client digital data processor, determining a source connection point and a target connection point for a second connector between the source graphical shape and the second target graphical shape based at least on the source graphical shape and the second target graphical shape;
with the client digital data processor, determining a length for the first connector based at least on the source connection point and the target connection point of the first connector;
with the client digital data processor, determining a length for the second connector based at least on the source connection point and the target connection point of the second connector;
with the client digital data processor, generating and displaying the first connector based at least on the source connection point, the target connection point, and the length of the first connector; and
with the client digital data processor, generating and displaying the second connector based at least on the source connection point, the target connection point, and the length of the second connector.

7. The method of claim 6, wherein the step of receiving the plurality of selection events includes receiving the one or more selection events from one or more of: conductive gloves, wand controllers, any of an augmented reality peripheral and controller, any of a virtual reality peripheral and controller, a camera, and a machine vision peripheral.

8. The method of claim 6, further comprising:
responding to receiving a selection event subsequent to the third selection event by determining whether a said connector exists between the source graphical shape and a selected one of said target graphical shapes; and
upon determining that a said connector exists, generating and displaying an inverted connector that replaces that connector between the source graphical shape and the selected target graphical shape.

9. The method of claim 8, wherein the subsequent selection event includes any of: a single tap of the connector, a double tap of the connector, a multi-touch single tap on the source graphical shape and the selected target graphical shape, a multi-touch double tap on the source graphical shape and the selected target graphical shape, and a long press on the source graphical shape followed by any of a single tap and a double tap of the selected target graphical shape.

10. The method of claim 6, including the step of identifying the source graphical shape and one of the target graphical shapes based on one or more of: a relative position of the source graphical shape and that target graphical shape, a relative time that the source graphical shape was added compared to that target graphical shape, a color of any of the source graphical shape and that target graphical shape, and a size of any of the source graphical shape and that target graphical shape.

11. A non-transitory computer-readable medium having stored therein a computer program product having instructions, which when executed by a client digital data processor cause the client digital data processor to:
identify a source graphical shape and a plurality of target graphical shapes based on at least on one or more received selection events determined from tracking one or more input locations on a sensor array that is coupled to the client digital data processor, wherein the selection event is a multi-touch event indicating substantially simultaneous touching of a plurality of the input locations, wherein the plurality of selection events comprises a multi-touch event comprising substantially simultaneous touching of a plurality of the input locations and includes (i) a first selection event in which a user holds a first finger on the sensor array in substantially a same position for a period constituting any of a long press or a long tap to identify the source graphical shape, (ii) a second selection event in which the user, simultaneous with the first selection event, touches a finger other than the first finger on the sensor array with a tap to identify a first said target graphical shape, and (iii) a third selection event successive to the second selection event in which the user, simultaneous with the first selection event, touches a finger other than the first finger on the sensor array with a tap to identify a second said target graphical shape;
determine at least the source graphical shape based on the first selection event;
determine at least the first target graphical shape based on the second selection event;

determine at least the second target graphical shape based on the third selection event;

determine a source connection point and a target connection point for a first connector between the source graphical shape and the first target graphical shape based at least on the source graphical shape and the first target graphical shape;

determine a source connection point and a target connection point for a second connector between the source graphical shape and the second target graphical shape based at least on the source graphical shape and the second target graphical shape;

determine a length for the first connector based at least on the source connection point and the target connection point of the first connector;

determine a length for the second connector based at least on the source connection point and the target connection point of the second connector;

generate and display the first connector based at least on the source connection point, the target connection point, and the length of the first connector; and generate and display the second connector based at least on the source connection point, the target connection point, and the length of the second connector.

12. The non-transitory computer-readable medium of claim 11, wherein the computer program product has instructions which, when executed by a client digital data processor, causes the client digital data processor to receive the plurality of selection events from one or more of: conductive gloves, wand controllers, any of an augmented reality peripheral and controller, any of a virtual reality peripheral and controller, a camera, and a machine vision peripheral.

13. The non-transitory computer-readable medium of claim 11, wherein the computer program product has instructions which, when executed by a client digital data processor, causes the client digital data processor to:

respond to receiving a selection event subsequent to the third selection event by determining whether a said connector exists between the source graphical shape and a selected one of said target graphical shapes; and upon determining that a said connector exists, to generate and display an inverted connector that replaces that connector between the source graphical shape and the selected target graphical shape.

14. The non-transitory computer-readable medium of claim 13, wherein the subsequent selection event includes any of: a single tap of the connector, a double tap of the connector, a multi-touch single tap on the source graphical shape and the selected target graphical shape, a multi-touch double tap on the source graphical shape and the selected target graphical shape, and a long press on the source graphical shape followed by any of a single tap and a double tap of the selected target graphical shape.

* * * * *